(12) United States Patent
McKinney et al.

(10) Patent No.: US 10,456,991 B2
(45) Date of Patent: Oct. 29, 2019

(54) SPACER FOR USE IN PRECISION BONDING APPLICATIONS THAT PROVIDES ENHANCED SHEAR STRENGTH

(71) Applicant: Altec Industries, Inc., Saint Joseph, MO (US)

(72) Inventors: Ryan J. McKinney, Parkville, MO (US); Kyle E. Hoffmann, Saint Joseph, MO (US); Jace Hegg, St. Joseph, MO (US)

(73) Assignee: ALTEC INDUSTRIES, INC., Saint Joseph, MO (US)

( * ) Notice: Subject to any disclaimer, the term of this patent is extended or adjusted under 35 U.S.C. 154(b) by 0 days.

(21) Appl. No.: 15/722,718

(22) Filed: Oct. 2, 2017

(65) Prior Publication Data
US 2018/0093425 A1    Apr. 5, 2018

Related U.S. Application Data

(60) Provisional application No. 62/403,418, filed on Oct. 3, 2016.

(51) Int. Cl.
| | |
|---|---|
| *B29C 65/00* | (2006.01) |
| *F16B 11/00* | (2006.01) |
| *B29C 65/48* | (2006.01) |
| *B29C 65/78* | (2006.01) |
| *B29C 65/02* | (2006.01) |
| *F16B 1/00* | (2006.01) |

(52) U.S. Cl.
CPC ............ *B29C 66/87* (2013.01); *F16B 11/006* (2013.01); *B29C 65/02* (2013.01); *B29C 65/48* (2013.01); *B29C 65/7826* (2013.01); *F16B 2001/0092* (2013.01)

(58) Field of Classification Search
CPC ..... B29C 65/48; B29C 65/7826; B29C 66/87; F16B 11/006; F16B 2001/0092
USPC ........................................................ 156/556
See application file for complete search history.

(56) References Cited

U.S. PATENT DOCUMENTS

| | | |
|---|---|---|
| 3,919,452 A | 11/1975 | Ettre et al. |
| 3,947,311 A | 3/1976 | Jarchow et al. |
| 4,346,918 A | 8/1982 | Lycan |
| 4,786,094 A | 11/1988 | Barton et al. |
| 4,825,342 A | 4/1989 | Gorski |
| 5,037,334 A | 8/1991 | Viselli et al. |
| 5,328,087 A | 7/1994 | Nelson et al. |
| 6,383,843 B1 | 5/2002 | Foong et al. |
| 6,824,038 B2 | 11/2004 | Bahry et al. |
| 6,826,928 B2 | 12/2004 | Berg et al. |
| 8,040,638 B2 | 10/2011 | Raymond |
| 8,367,239 B2 | 2/2013 | Hermann |
| 8,481,191 B2 | 7/2013 | Hermann |
| 2004/0016790 A1 | 1/2004 | Bahry et al. |
| 2006/0049669 A1 | 3/2006 | Yamamoto |
| 2008/0024926 A1 | 1/2008 | Raymond |
| 2009/0103164 A1 | 4/2009 | Fijol et al. |

(Continued)

*Primary Examiner* — Sonya M Sengupta
(74) *Attorney, Agent, or Firm* — NEO IP

(57) ABSTRACT

A spacer-locator with integrated locator pins and spacer tabs for use in joining applications. The spacer-locator provides consistent and accurate spacing between mating surfaces and the locator pins provide enhanced location control of the joining components while providing a mechanical advantage to the shear strength at the joint. Also, a spacer-locator for joining at least two objects along mating surfaces, the spacer-locator constraining more than five degrees of freedom for the objects to be joined.

23 Claims, 24 Drawing Sheets

(56) References Cited

U.S. PATENT DOCUMENTS

2010/0136396 A1 6/2010 Hermann et al.
2013/0078494 A1 3/2013 Hermann

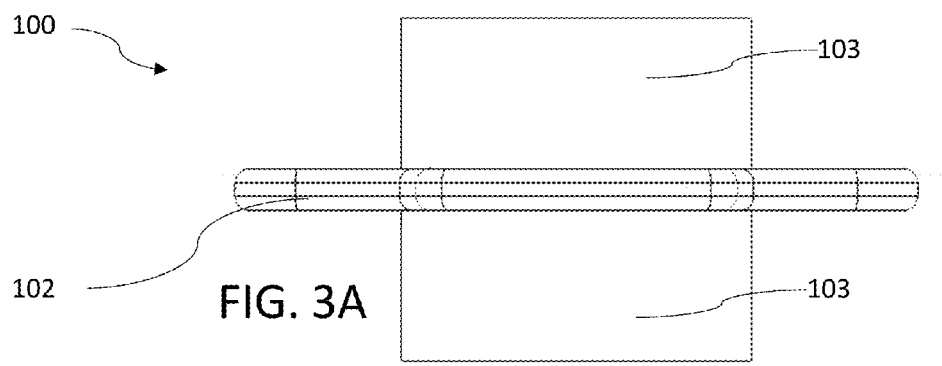
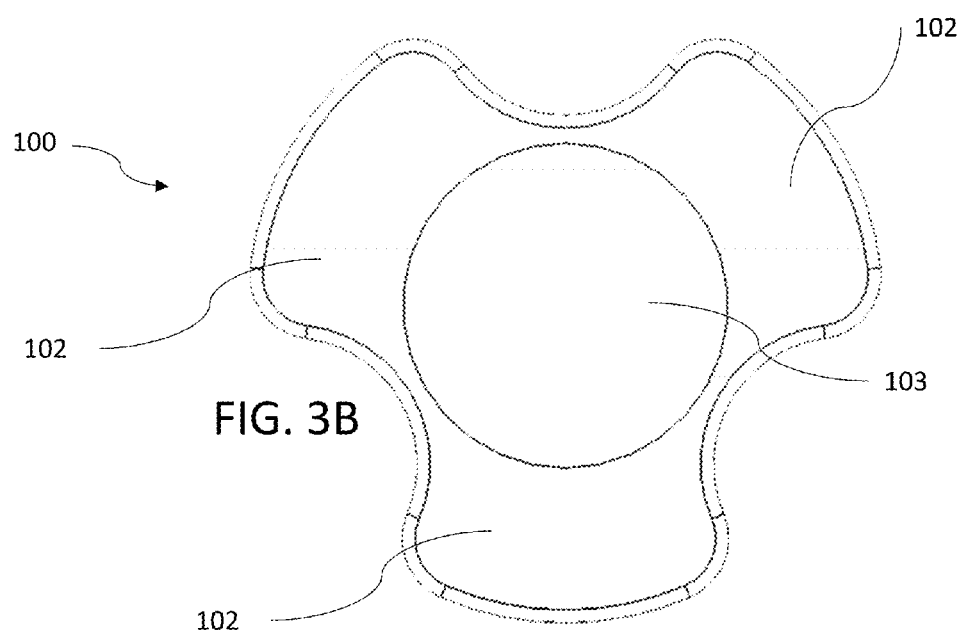
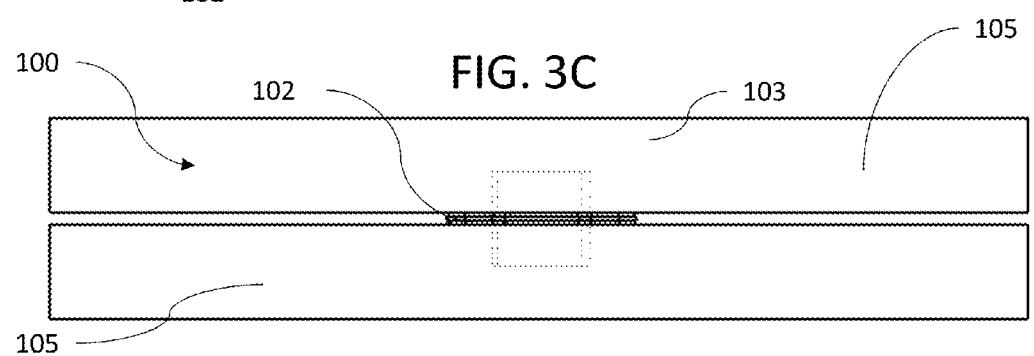

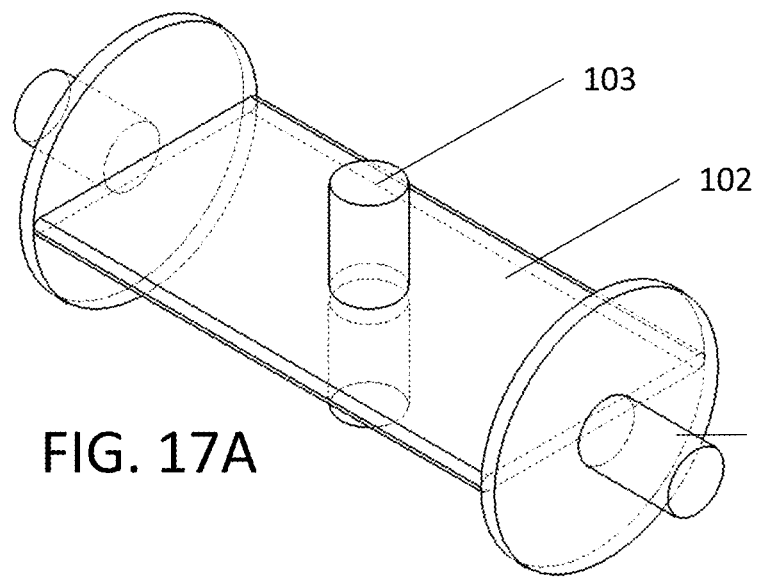
FIG. 17A
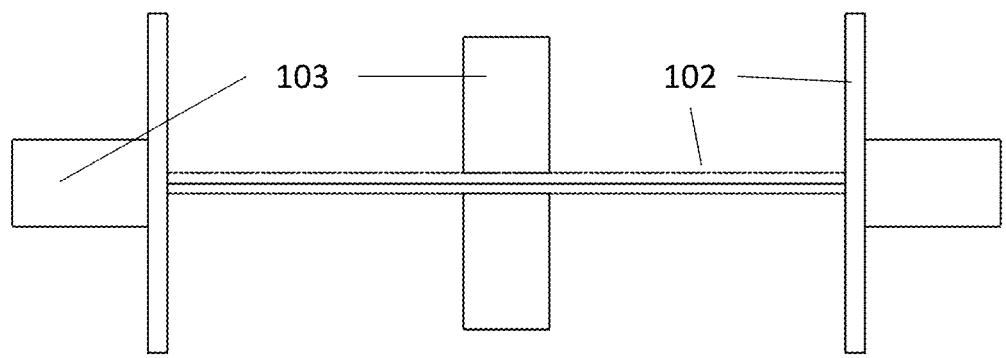
FIG. 17B
FIG. 17C
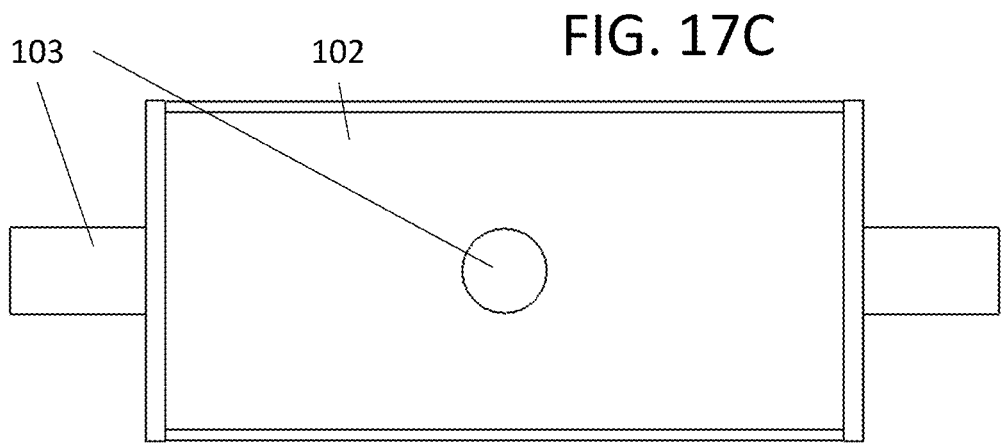

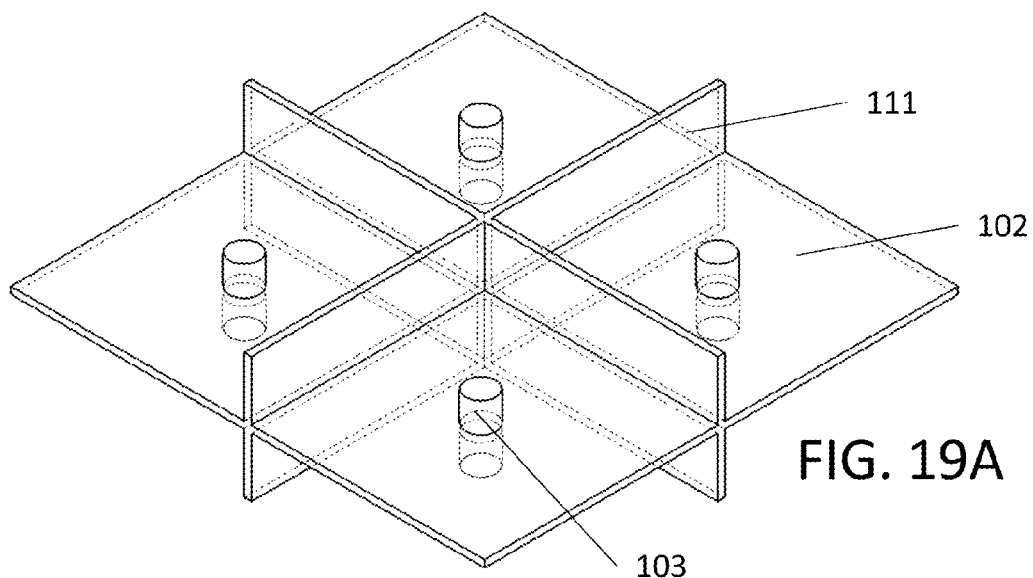
FIG. 19A
FIG. 19B
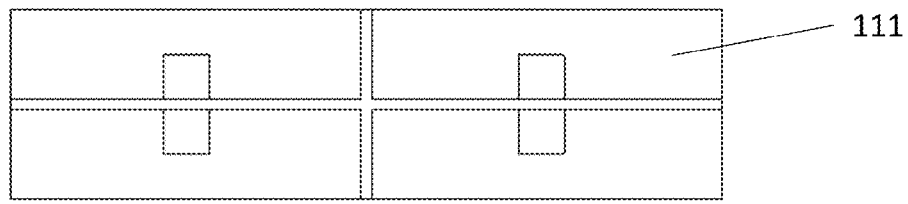
FIG. 19C
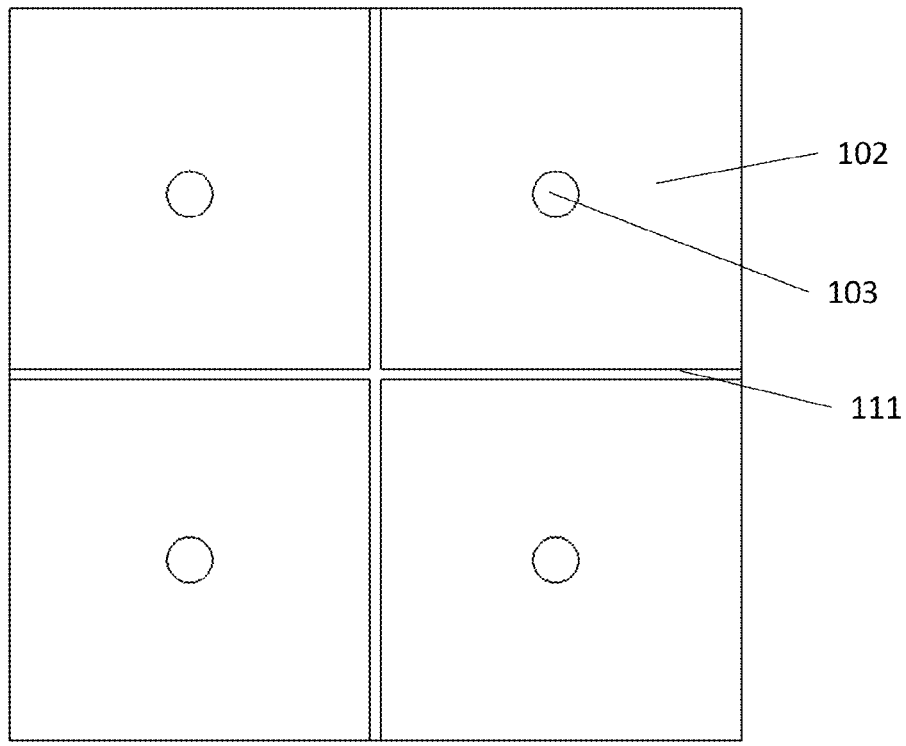

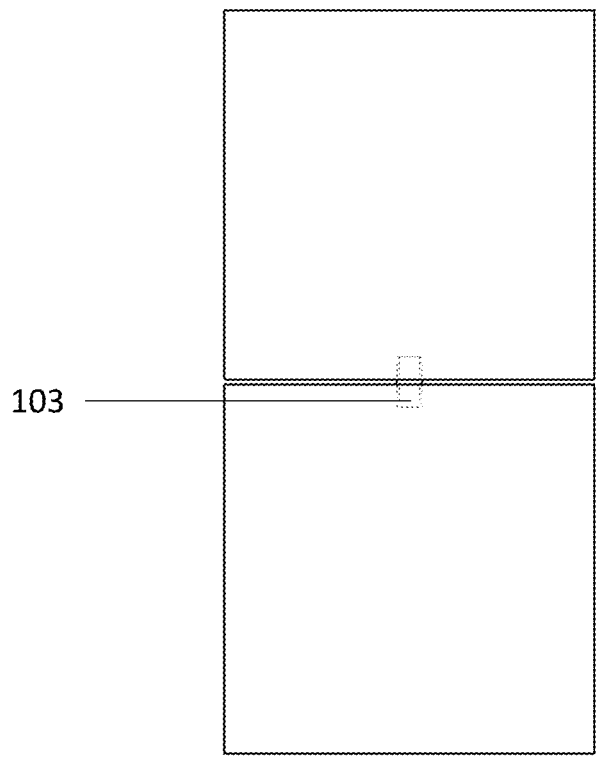
103 ——  FIG. 21A
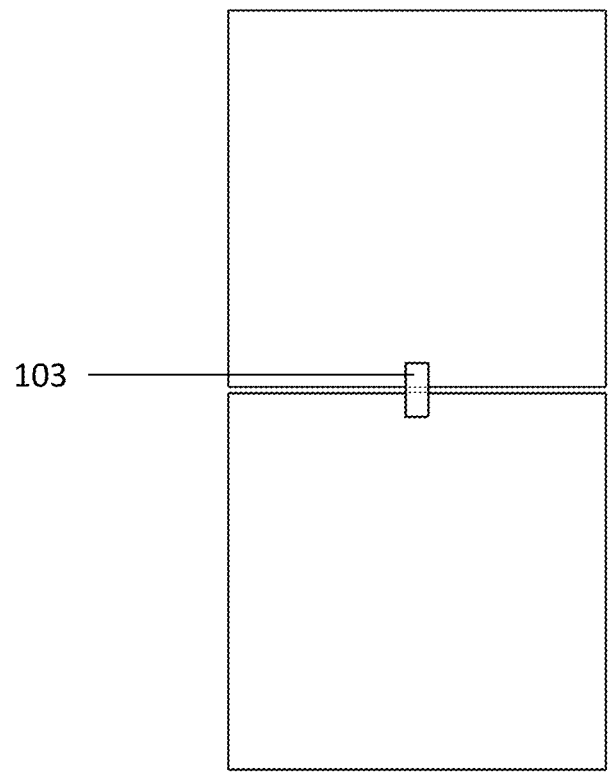
103 ——  FIG. 21B

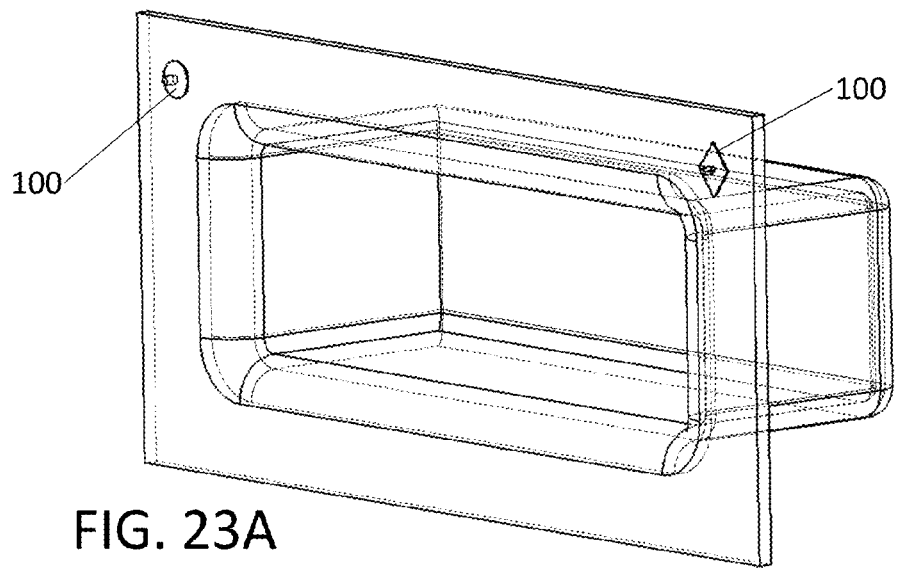
FIG. 23A
FIG. 23B
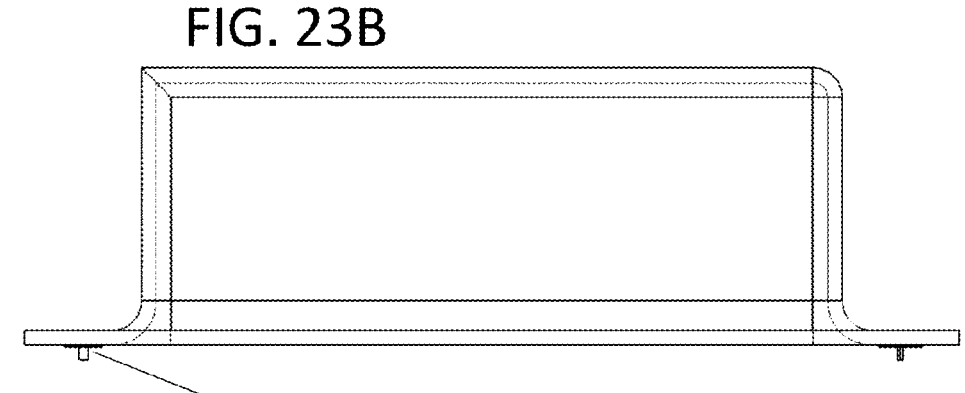
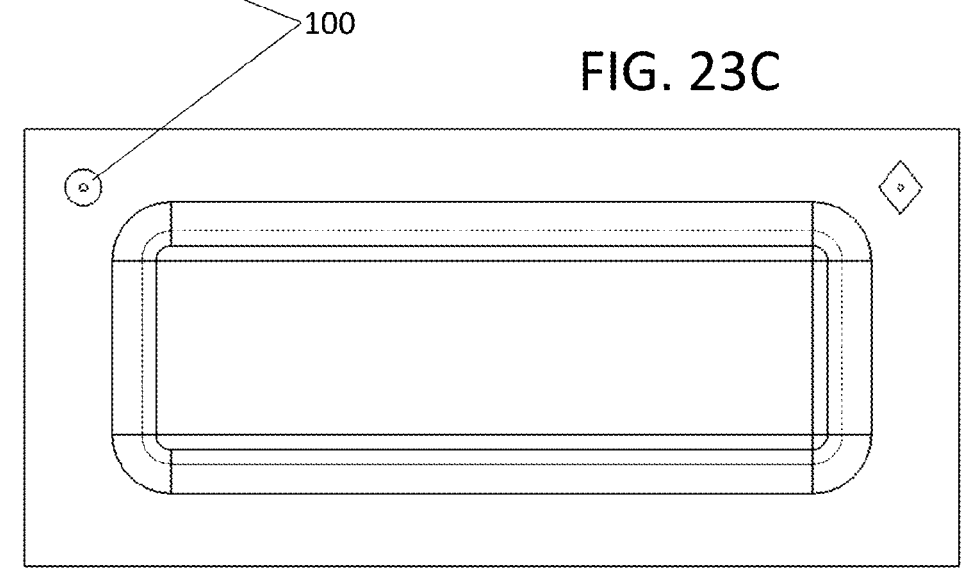
FIG. 23C

SPACER FOR USE IN PRECISION BONDING APPLICATIONS THAT PROVIDES ENHANCED SHEAR STRENGTH

BACKGROUND OF THE INVENTION

1. Field of the Invention

The present invention relates to spacers, and more specifically to spacers with locators used in a spacing and locating process.

2. Description of the Prior Art

It is generally known in the prior art to utilize spacers to ensure adhesive thickness in bonding applications.

Prior art patent documents include the following:

U.S. Pat. No. 4,346,918 for pipe spacer used in welding by inventor Lycan, filed May 7, 1979 and issued Aug. 31, 1982, describes a split ring pipe spacer used to separate a pipe from the fitting shoulder during welding. The spacer has yieldable protrusions for the purpose of maintaining proper spacing and alignment of the pipe and fitting during welding.

U.S. Pat. No. 8,040,638 for self-fixturing pivoting actuator by inventor Raymond, filed Jul. 27, 2006 and issued Oct. 18, 2011, describes a rotary actuator arm assembly for positioning a transducer over a data track of at least one rotating magnetic disk. The actuator includes self-contained spacers with semi-kinetic mounting features to accurately locate and secure a set of self-aligning components, thereby eliminating azimuth alignment problems created by conventional assembly procedures.

U.S. Pat. No. 3,919,452 for precision bonding system by inventor Ettre et al., filed Oct. 23, 1973 and issued Nov. 11, 1975, describing a sealing system for bonding which incorporates a sealing cement and at least three spacers disposed within said sealing cement, allowing two members to be easily and securely bonded together with a precise separation gap between them and with the lateral flow of the sealing cement precisely controlled. Preferably, spherical spacers are employed having a diameter equal to the spacing desired between the members being joined, and the sealing cement incorporates a thermal expansion compatible with the thermal expansion of the members being joined.

U.S. Pat. No. 4,825,342 for vehicle headlamp assembly locator by inventor Gorski, filed May 27, 1988 and issued Apr. 25, 1989, describing a vehicle headlamp assembly locator for proper positioning of a vehicle headlamp assembly in a vehicle in alignment with the hood of the vehicle. The locator includes an elongated spacer element for determining the horizontal distance between a designated portion of the vehicle headlamp assembly and a forward portion of the vehicle hood. An upright spacer element is provided to position the elongated spacer element in the desired vertical position.

US Patent Application No. 2009/0103164 for spacers for maintaining display apparatus alignment by inventor Fijol et al., filed on Oct. 19, 2007, disclosing methods and apparatus for forming a display apparatus. According to one aspect of the invention, the display apparatus includes a first substrate having an aperture layer formed thereon, a light guide for guiding light towards the aperture layer, a plurality of MEMS light modulators for modulating light passing through the aperture layer from the light guide, and a spacer substantially surrounding the light guide for keeping the light guide and the first substrate a predetermined distance apart from one another, thereby forming a gap between the first substrate and the light guide. Alternatively or in addition, the first substrate may have a control matrix formed thereon.

U.S. Pat. No. 4,786,094 for mounting clip including break-away spacer element by inventor Barton et al., filed Oct. 6, 1987 and issued on Nov. 11, 1988, discloses a clip mounting structure which is attachable to a vehicle body without use of fixtures. This is done by initially providing the mounting structure with spacer tabs. The spacer tabs are positioned with respect to an available reference location, such as another previously mounted molding or panel. The tabs are break-away structures and are removed after the mounting structure is secured in place. The clip mounting structure is then used to secure a molding in place.

U.S. Pat. No. 3,947,311 for method and apparatus for cementing in the manufacture of double-pane insulating glass units by inventor Jarchow et al., filed on Nov. 20, 1973 and issued on Mar. 30, 1976, discloses a method to double or plural pane insulating packages by placing panes together with a spacer, thereby leaving an interspace at the periphery into which cement is injected. Two nozzles are used to inject cement into the interspace, starting from a common starting region and working in opposite directions around the periphery to a common terminal point. Conveyors and control systems are provided to mechanize the process.

U.S. Pat. No. 5,328,087 for thermally and electrically conductive adhesive material and method of bonding with same by inventor Nelson, filed Mar. 29, 1993 and issued on Jul. 12, 1994, describing a thermally and electrically conductive adhesive material comprising a hardened adhesive, and a non-solidified filler containing a liquid metal dispersed in separate spaced regions of the adhesive. The hardened adhesive provides a mechanical bond whereas the filler provides continuous thermal and electrical metal bridges, each bridge extending through the adhesive and contacting the bonded surfaces. The method includes (a) dispersing a filler containing a liquid metal into an unhardened adhesive, (b) contacting the unhardened adhesive and the filler in non-solidified state to the surfaces resulting in separate spaced regions of the non-solidified filler contacting both surfaces, and (c) hardening the adhesive.

U.S. Pat. No. 6,383,843 for using removable spacers to ensure adequate bondline thickness by inventor Foong et al., filed Apr. 4, 2000 and issued May 7, 2002, describing a method for die bonding a semiconductor device to a substrate, which method provides adequate and consistent bondline thickness and assures that the die is spaced from the substrate a predetermined amount. Embodiments include removably attaching a flexible spacer of a predetermined thickness, such as a strip of paper or plastic, to the bonding pad of a substrate, such as an organic lead frame, so that it partially covers the bonding pad while leaving other parts of the bonding pad exposed. Die attach material, such as epoxy paste, is then applied to the exposed areas of the bonding pad, and a die is placed over the bonding pad in contact with the epoxy and the spacer. Due to the presence of the spacer, the die cannot sink when it is placed on the epoxy paste, resulting in a consistent bondline thickness equal to the spacer thickness. Thereafter, the epoxy paste is cured and the spacer removed, leaving a gap between the die and the lead frame of the predetermined spacer thickness, which is underfilled with plastic encapsulant material when the die is encapsulated. Thus, an ideal bondline thickness is consistently achieved, improving reliability at minimal additional cost, and no additional materials are introduced into the finished device which could adversely affect reliability.

U.S. Pat. No. 6,826,928 for methods for positioning and bonding elements in substrates by inventor Berg et al., filed on Mar. 19, 2002 and issued Dec. 7, 2004, describing a device and technique for placing and bonding identical elements to holes in a substrate where spacer balls and a reference surface are used to achieve the desired accuracy.

U.S. Pat. No. 6,824,038 for method and tool for aligning piping components by inventor Bahry et al., filed Jul. 23, 2002 and issued Nov. 30, 2004, describing a pipe aligning tool for providing proper alignment and spacing between two piping components to be welded together in an end to end abutted relationship. The tool includes a spacer lying in a single plane for positioning between the ends of the piping components to provide the proper spacing. A pipe locator in the form of two projections, projects perpendicularly outwardly from each side of the spacer for concentric alignment of piping components on opposing sides of the spacer when abutted with the respective pipe locators. The simple construction of the tool permits two piping components to be both concentrically aligned and properly spaced for welding in a simple task which can be manually performed without depending upon visual alignment by the user.

U.S. Pat. No. 8,367,239 for cell separator for minimizing thermal runaway propagation within a battery pack by inventor Hermann, filed Aug. 8, 2009 and issued Feb. 5, 2013, describing a spacer assembly for use with a cell mounting bracket in a battery pack. The spacer assembly, comprised of one or more spacers, maintains the positions of the batteries within the battery pack during a thermal event and after the cell mounting bracket loses structural integrity due to the increased temperature associated with the thermal event. By keeping the battery undergoing thermal runaway in its predetermined location within the battery pack, the minimum spacing between cells is maintained, thereby helping to minimize the thermal effects on adjacent cells while ensuring that the cooling system, if employed, is not compromised. As a result, the risk of thermal runaway propagation is reduced.

SUMMARY OF THE INVENTION

The present invention relates to a spacer-locator operable to be used between surfaces to be joined that provides for spacing control, location control, and additional mechanical strength against shear stress/fatigue.

It is an object of this invention to provide a spacer-locator for controlled spacing and location of two or more objects to be joined. It is a further object of this invention to provide a spacer-locator that provides a controlled thickness of an adhesive to be used in bonding. It is another object of this invention to provide a spacer-locator that incorporates the material characteristics of the joined materials including, but not limited to, corrosion resistance, conductivity, etc. It is yet another object of the present invention to provide a spacer-locator that provides enhanced location control of bonded surfaces, thereby lowering manufacturing costs. It is a further object of the present invention to provide a spacer-locator that provides enhanced shear strength of at least two bonded surfaces. It is a further object of the present invention to provide a spacer-locator that provides anti-rotation benefits to a joint.

One embodiment of the present invention provides a spacer-locator that provides for a controlled thickness of an adhesive to be used in bonding and maintaining the bond between two bonded surfaces.

Another embodiment of the present invention provides a spacer-locator with locator pins manufactured with the same material as the bonded surfaces.

Yet another embodiment of the present invention provides a spacer-locator with strength enhancing locator pins.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3A illustrates a side view of a spacer-locator with three spacer tabs and two cylindrical locator pins according to one embodiment of the present invention.

FIG. 3B illustrates a top view of the embodiment illustrated in FIG. 3A.

FIG. 3C illustrates a side view of the embodiment illustrated in FIGS. 3A and B, wherein the spacer-locator is included in a bonding assembly.

FIG. 17A illustrates a perspective view of a spacer-locator that aligns 4 surfaces according to one embodiment of the present invention.

FIG. 17B illustrates a side view of the embodiment illustrated in FIG. 17A.

FIG. 17C illustrates a top view of the embodiment illustrated in FIGS. 17A and B.

FIG. 19A illustrates a perspective view of a spacer-locator that aligns 8 mating surfaces according to one embodiment of the present invention.

FIG. 19B illustrates a side view of the embodiment illustrated in FIG. 19A.

FIG. 19C illustrates a top view of the embodiment illustrated in FIGS. 19A and B.

FIG. 21A illustrates a transparent side view of two objects held in position by a spacer-locator with a cylinder locator and no spacer tabs according to the present invention.

FIG. 21B illustrates a cross-sectional view of the embodiment illustrated in FIG. 21A.

FIG. 23A illustrates a perspective view of a spacer-locator that is integrated with one of the objects to be joined.

FIG. 23B illustrates a side view of the embodiment illustrated in FIG. 23A.

FIG. 23C illustrates a top view of the embodiment illustrated in FIGS. 23A and B.

DETAILED DESCRIPTION

Figure 1:
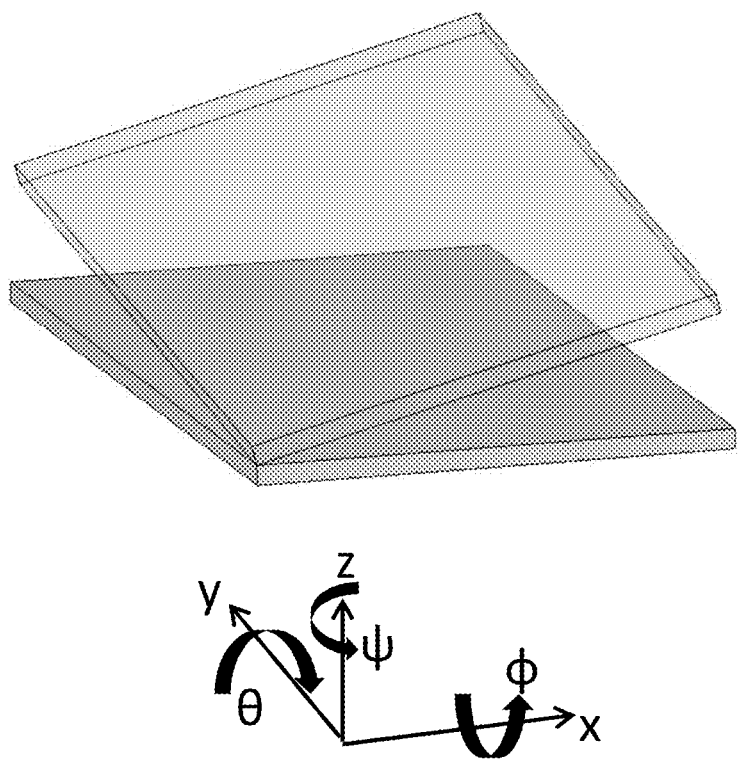
FIG. 1 is a perspective drawing showing the x-axis, y-axis, z-axis and theta, phi and psi angles for two objects to be juxtaposed at their mating surfaces.

The present invention is generally directed to a spacer-locator for use in spacing and locating two objects. The spacer-locator provides for spacing and locating two objects to be chemically or physically affixed to one another, such as with adhesive, by welding, by soldering, by vacuum, by mechanical fastening and the like.

In one embodiment, the present invention includes a spacer-locator that provides for a controlled thickness of an adhesive to be used in bonding and maintaining the bond between two bonded surfaces.

In another embodiment, the present invention includes a spacer-locator manufactured from the same material as the bonded surfaces.

In yet another embodiment, the present invention includes a spacer-locator including locating pins that provide additional shear strength.

In yet another embodiment, the present invention includes a spacer-locator that prevents rotation between two mating surfaces.

Typical prior art spacers generally provide adhesive thickness tolerance or locational tolerance of adhered surfaces. The prior art does not disclose, teach, or suggest the use of a spacer-locator that provides for controlled spacing to be used in joining and maintaining the joint between two mating surfaces, enhanced positional tolerance for ease of assembly, and enhanced structural rigidity of joint by incorporating locator pins which provide a mechanical advantage against shear stress.

The present invention is directed to a method of joining two or more surfaces and at least one spacer-locator with locator pins that provide location control and a mechanical advantage against shear stress. The method of the present invention includes locating holes in the two or more surfaces. The locating holes are created by drilling or, alternatively, the locating holes are created through a different process, by way of example and not limitation, incorporating the negative space into the design of the two or more surfaces. The method of the present invention further includes placing spacer-locators into the locating holes of one or more of the two or more surfaces. The method of the present invention further includes applying adhesive or other joining agent to one or more of the two or more surfaces. The present invention further includes the aligning of corresponding locating holes on each of the two or more surfaces that are being joined and pressing the surfaces together, thereby joining the surfaces and the at least one spacer's locator pins, aligning the surfaces in relation to one another. Alternatively, locator pins are placed in the corresponding locator holes, the two or more surfaces are aligned and pressed together, and the joining agent is subsequently injected into the gap between the two or more surfaces.

In one embodiment, the invention is a spacer-locator of a predetermined thickness that is capable of withstanding the pressure applied during a joining process, thereby maintaining the separation of the mating surfaces while ensuring controlled thickness of the joining agent between the mating surfaces. The spacer-locator preferably incorporates pins which serve as locators for aligning the mating surfaces and provide additional shear strength to the joint after the joining process has been completed. In an alternative embodiment, the spacer-locator includes a spacer body, to which the locator pins are reversibly or irreversibly attachable.

The surfaces of the spacer-locator are created with different tolerances, depending on the use of the spacer. This reduces manufacturing costs associated with high-tolerance surfaces that are not critical to the bonding application. By way of example and not limitation, the locator pin sizing is manufactured to a tighter tolerance or looser tolerance depending on whether positioning jigs are used during the bonding process of the two surfaces. Additionally, the spacer tab thickness is manufactured to a tighter tolerance or looser tolerance depending on the importance of the adhesive thickness or joint separation. By way of example and not limitation, the tolerance ranges from 1% to 15% of the specified spacer tab thickness.

In a preferred embodiment of the present invention, the locator pins act as a functional replacement to the positioning jigs currently needed to align components during the joining process. The more complex the final assembly, the larger the impact the locator pins have in reducing the manufacturing cost of the finished product. By way of example and not limitation, bonding a step to a platform requires numerous unique jigs to maintain the positional tolerance during the adhering process. An example of bonding a step to a platform includes, but is not limited to, the step attached to an elevated platform used with utility trucks. Implementing tight tolerance for a spacer-locator with locator pins provides the same benefits of the jig without the added expense of storage and maintenance of numerous jig assemblies. This provides for lower manufacturing costs and subsequently higher profits.

In a preferred embodiment of the present invention, the spacer tabs and locator pins are made of the same material as the mating surfaces. This maintains uniform material characteristics throughout the entire assembly, including by way of example and not limitation, conductivity, corrosion resistance, and aesthetic qualities. Suitable materials include, but are not limited to, fiberglass, plastics, metals, resins, epoxy, composite laminate, and/or ceramic.

The spacer-locator is designed to prevent rotation of bonded surfaces. In one embodiment of the present invention, rotation is prevented between joined surfaces by incorporating two spacer-locators of the present invention on the same mating surfaces. In an alternative embodiment of the present invention, rotation is prevented between mating surfaces by incorporating an anti-rotation feature into the spacer tab.

Thus, the spacer-locator provides for controlling the degrees of freedom between two or more surfaces. For juxtaposed planar surfaces that are to be glued together, there are six possible degrees of freedom with respect to one another (six relative degrees of freedom): the x-, y- and z-axes and the theta, phi, and psi angles (FIG. 1). The x-axis and y-axis are along the plane of the first mating surfaces and the z-axis traverses the interface of the first mating surfaces. In the case of planar surfaces, the z-axis is perpendicular to the plane of the mating surfaces. The psi angle is in the plane of the first mating surfaces (around the z-axis); the phi angle is around the x-axis, and the theta angle is around y-axis. Adding a locator pin constrains two axes (x- and y-axes) and two rotational degrees of freedom (phi and theta) and therefore reduces the degrees of freedom to two. Adding an anti-rotation component constrains rotation around the z-axis (psi angle), removes another degree of freedom and reduces the degrees of freedom to one. Adding a spacer tab partially constrains a fifth degree of freedom (z-axis) and additionally constrains the phi and psi angles. Thus, a spacer-locator according to the present invention can constrain two objects to two or one degrees of freedom and can partially constrain the last degree of freedom.

Referring now to the drawings in general, the illustrations are for the purpose of describing preferred embodiments of the invention and are not intended to limit the invention thereto.

Figure 2A:
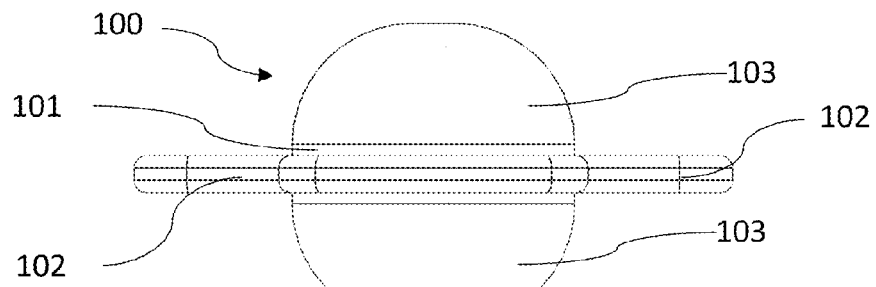
FIG. 2A illustrates a side view of a spacer-locator with three spacer tabs and two rounded locator pins according to one embodiment of the present invention.

FIG. 2A is a side view that illustrates a preferred embodiment of the present invention. The spacer-locator 100 includes a spacer body 101, spacer tabs 102, and locator pins 103. The spacer body 101 acts as the core of the spacer-locator 100, and acts as a mounting surface for the spacer tabs 102 and the locator pins 103. The spacer tabs 102 lay on a plane and extend outward perpendicularly from the direction of the locator pins 103 and outwardly from the spacer body 101. Alternatively, the spacer body 101, spacer tabs 102, and locator pins 103 are formed from one piece of material. Alternatively, the locator pins 103 attach to the spacer body 101 through threaded members. Alternatively, the locator pins 103 attach to the spacer body 101 with adhesive.

In one embodiment, the spacer body is about 0.030" thick. Alternatively, the spacer body thickness is between 0.010" and 0.030". In another alternative embodiment, the spacer body thickness is between 0.030" and 0.1". In one embodiment, the spacer includes a smooth surface where the locator pin is mounted with adhesive. In another embodiment, the spacer body incorporates an internal threading for mechanical fastening of a locator pin.

In another embodiment of the present invention, the spacer tabs have a thickness of about 0.030". Alternatively, the spacer tab thickness is between 0.010" and 0.030". In another alternative embodiment, the spacer tab thickness is between 0.030" and 0.1". Alternatively, the spacer tab thickness is determined by the final adhesive thickness requirements between the bonded surfaces.

In one embodiment of the present invention, the spacer-locator, including the spacer tabs and locator pins are created from a single piece of material. By way of example and not limitation, the spacer-locator is formed, milled, molded, stamped, and/or 3-D printed as one piece.

In an alternative embodiment of the present invention, the spacer tabs and locator pins are made of a different material than the mating material based on the joining application.

Preferably, the spacer tabs and locator pins are made of a material having a higher shear strength than the mating material and the mating agent. By way of example and not limitation, the shear strength of Methyl Methacrylate is approximately 3 ksi and the shear strength of carbon steel ranges from 36 to 120 ksi.

Alternatively, the spacer-locator is formed from at least two pieces of material. By way of example and not limitation, the spacer body is formed, milled, molded, stamped, and/or 3-D printed separately from the locator pins. Locator pins are then selected and attached to the spacer body depending on the requirements of the bonded assembly. Attachment of the locator pins to the spacer body occurs through mechanical fastening, by way of example and not limitation, through the utilization of threaded members. In one embodiment, the locator pins incorporate a threaded member with an external thread, and the spacer body incorporates a threaded member with internal threads. Alternatively, the spacer body incorporates external threads and the locator pins incorporates internal threads.

In another embodiment, the locator pins are attached with adhesive. Suitable adhesive includes, but is not limited to, laminates, hot adhesives, reactive adhesives, polyester—polyurethane resin, polyols—polyurethane resin, acrylic polymers—polyurethane resin, epoxy, methacrylate, and/or cyanoacrylate. In another embodiment the locator pins are attached through thermal bonding, including but not limited to, plastic welding, electric welding, tungsten arc welding and/or soldering. In another embodiment the locator pins are attached through the use of magnets within the locator pins and the spacer body. This modular design provides flexibility of the spacer-locator characteristics, thereby having the advantage of reduced costs as spacer-locators do not need to be custom-made for every bonding application.

Figure 2B:
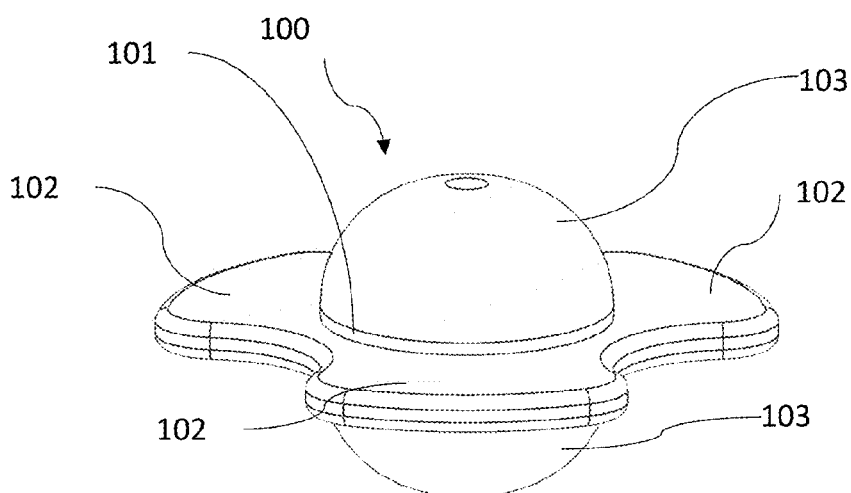
FIG. 2B illustrates a perspective view of the embodiment illustrated in FIG. 2A.

FIG. 2B is a perspective view of the spacer-locator embodiment illustrated in FIG. 2A.

Figure 2C:
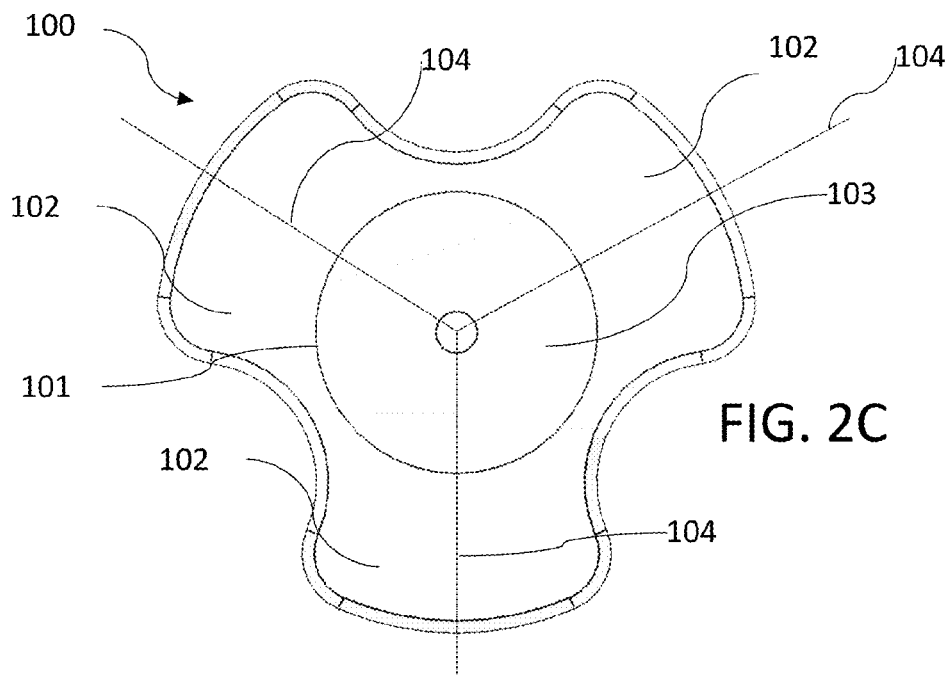
FIG. 2C illustrates a top view of the embodiment illustrated in FIGS. 2A and 1B.

FIG. 2C is a top view of the spacer-locator illustrated in FIGS. 2A and B, further showing the centerline of the spacer tabs 104. The spacer tabs 104 are offset randomly or non-randomly. For example, the offset of the centerline of the spacer tabs 104 is governed by an equation, wherein the equation is, by way of example and not limitation, 360 degrees divided by the number of spacer tabs. An example is shown in FIG. 2C, where the centerlines of the three spacer tabs are offset non-randomly by 120 degrees around the vertical.

In another embodiment of the present invention, the locator pins are sized and shaped according to the shear strength required of the assembly. Prior art spacers ultimately weaken the joint by displacing a portion of adhesive and providing no additional strength to the joint. The spacer-locator of the present invention addresses this weakness and improves upon the prior art by not only preventing the loss of strength at the joint by maintaining spacing, but by adding mechanical shear strength at the joint through the use of locator pins. The locator pins work in tandem with the shear strength associated with the joining agent. In certain embodiments of the present invention, the locator pins are shaped to maximize the shear strength of the joint. By way of example and not limitation, FIG. 3A shows one embodiment of the present invention where the locator pins are shaped and sized for their ability to provide shear strength to the joint.

FIG. 3A is a side view that illustrates an embodiment of the present invention. The spacer-locator 100 includes spacer tabs 102, and locator pins 103. The spacer tabs 102 act as the core of the spacer-locator 100, and are a mounting surface for the locator pins 103. The spacer tabs 102 lay on a plane and extend outward perpendicularly from the direction of the locator pins 103. The spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive.

FIG. 3B is a top view of the spacer-locator embodiment illustrated in FIG. 3A.

FIG. 3C is a side view of the spacer-locator embodiment illustrated in FIGS. 3A and B, further showing an example of bonding surfaces 105.

Figure 4A:
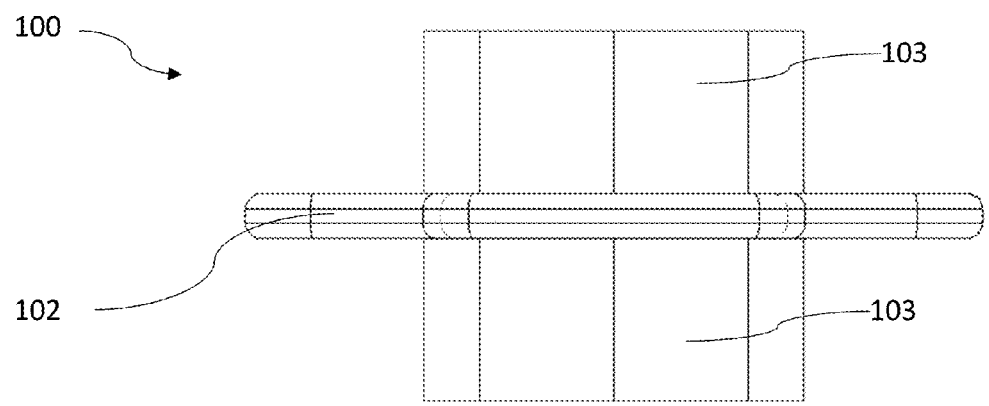
FIG. 4A illustrates a side view of a spacer-locator with three spacer tabs and two octagonal locator pins according to one embodiment of the present invention.

FIG. 4A is a side view of the spacer-locator embodiment in FIG. 3A, wherein the locator pins 103 are hexagonal in shape. The hexagonal shape of the locator pins 103 advantageously prevents two substrates from rotating about the spacer-locator if only 1 spacer-locator is used in bonding the two substrates.

Figure 4B:
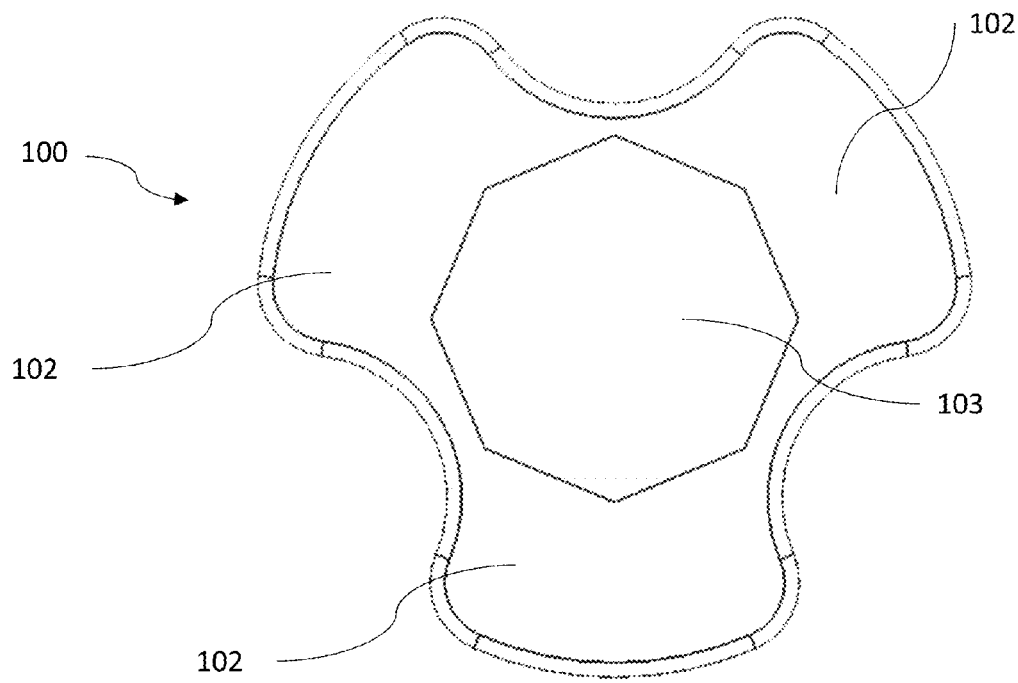
FIG. 4B illustrates a top view of the embodiment illustrated in FIG. 4A.

FIG. 4B is a top view of the spacer-locator embodiment in FIG. 3B, wherein the locator pins 103 are hexagonal in shape.

In another embodiment the spacer-locator contains two spacer tabs. In another alternative the spacer-locator contains more than two spacer tabs. In another embodiment the spacer-locator contains between three and eight spacer tabs. Alternatively, the spacer-locator contains one spacer tab.

In a preferred embodiment of the present invention, the spacer's locator pins incorporate anti-rotation features, thereby eliminating the need for the second spacer-locator in an assembly. The incorporated anti-rotation feature provides the benefit of reducing cost, weight, and assembly time.

Figure 5A:
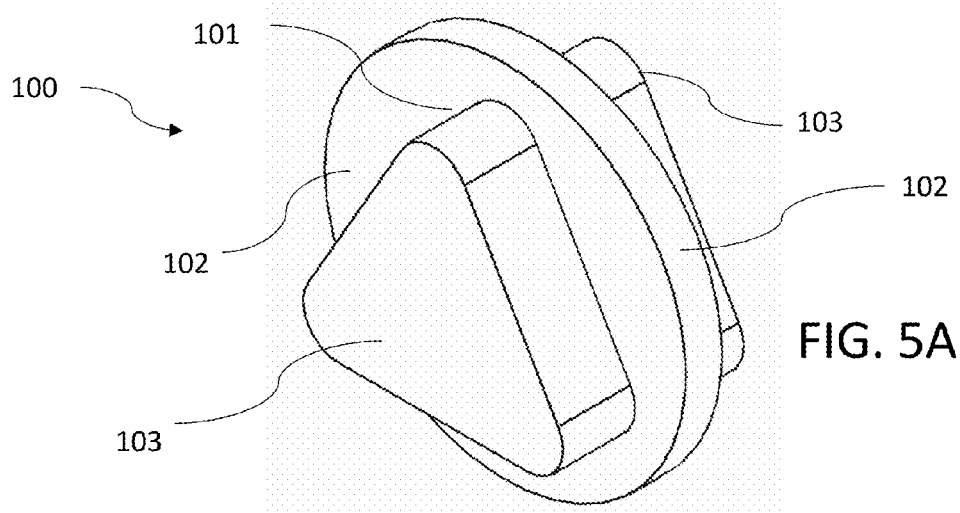
FIG. 5A illustrates a perspective view of a spacer-locator with one spacer tab and 2 triangular locator pins according to one embodiment of the present invention.

FIG. 5A is a perspective view of the spacer-locator embodiment in FIG. 3A, wherein the locator pins 103 are triangular in shape and the spacer-locator includes only one spacer tab 102. The triangle shape of the locator pins 103 advantageously prevents two substrates from rotating about the spacer-locator even if only 1 spacer-locator is used in bonding the two substrates. Notably, the spacer-locator illustrated in FIG. 5A prevents rotation between bonded surfaces by incorporating an anti-rotation feature into the locator pin.

Figure 5B:
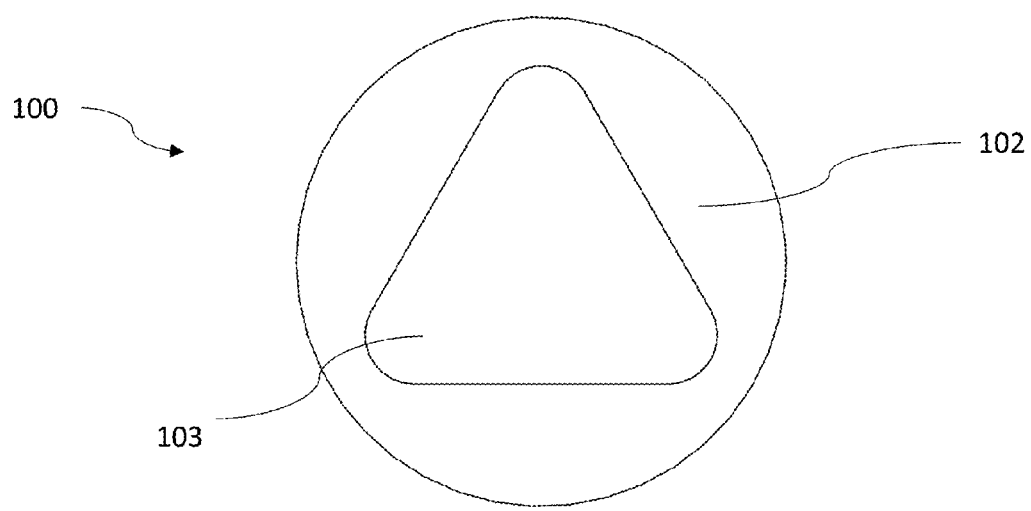
FIG. 5B illustrates a side view of the embodiment illustrated in FIG. 5A.

FIG. 5B is a top view of the spacer-locator embodiment in FIG. 5A.

Figure 5C:
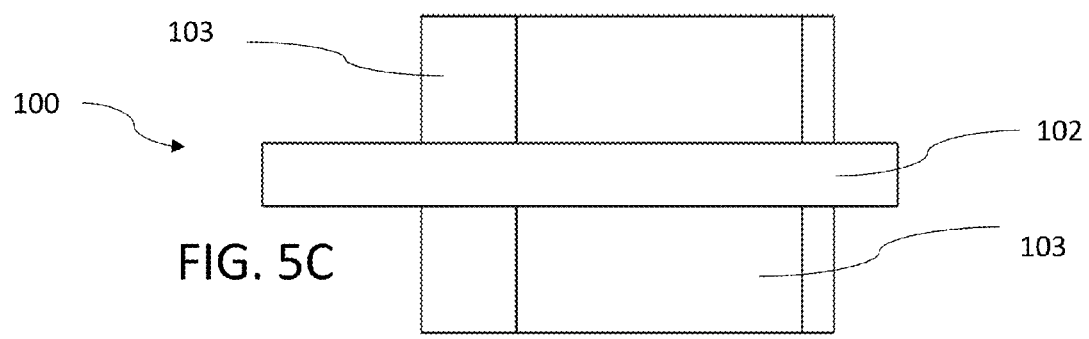
FIG. 5C illustrates a top view of the embodiment illustrated in FIGS. 5A and B.

FIG. 5C is a side view of the spacer-locator embodiment in FIG. 5A.

Figure 6A:
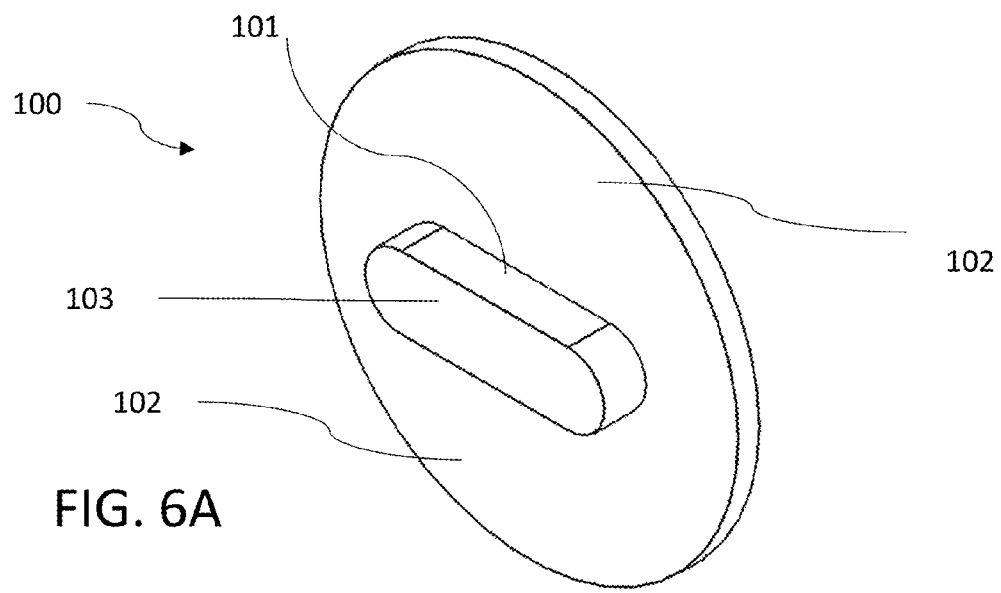
FIG. 6A illustrates a perspective view of a spacer-locator with one spacer tab and 2 slotted locator pins according to one embodiment of the present invention.

FIG. 6A is a perspective view of the spacer-locator embodiment in FIG. 3A, wherein the locator pins 103 are slotted in shape. The slotted locator pins are advantageously the simplest method to machine. The shape of the slotted spacer-locator also advantageously provides for anti-rotation feature.

Figure 6B:
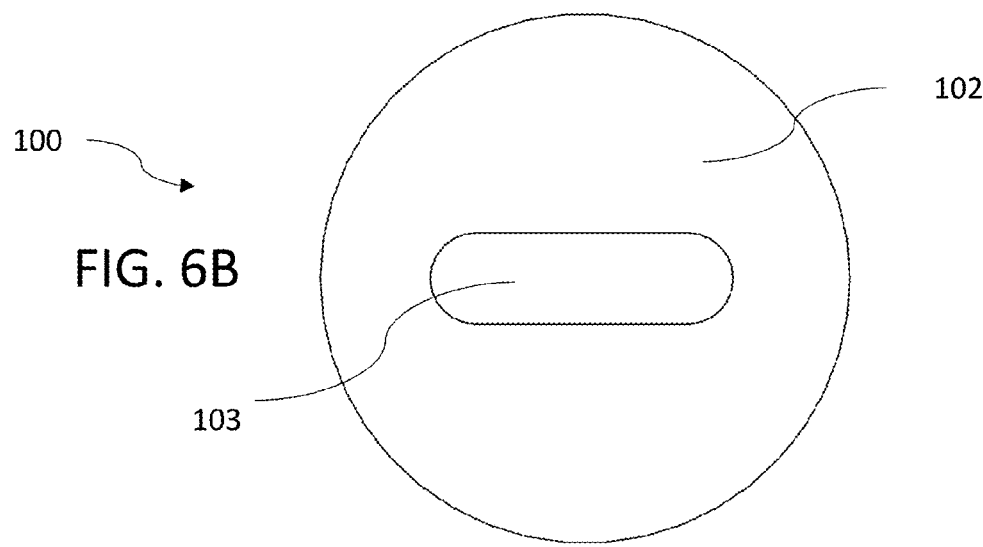
FIG. 6B illustrates a side view of the embodiment illustrated in FIG. 6A.

FIG. 6B is a top view of the spacer-locator embodiment in FIG. 6A.

Figure 6C:
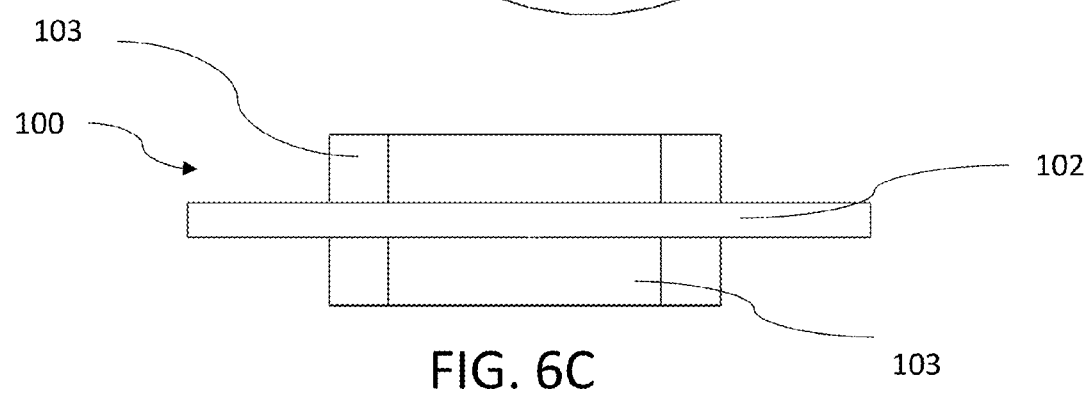
FIG. 6C illustrates a top view of the embodiment illustrated in FIGS. 6A and B.

FIG. 6C is a side view of the spacer-locator embodiment in FIG. 6A.

Figure 7A:
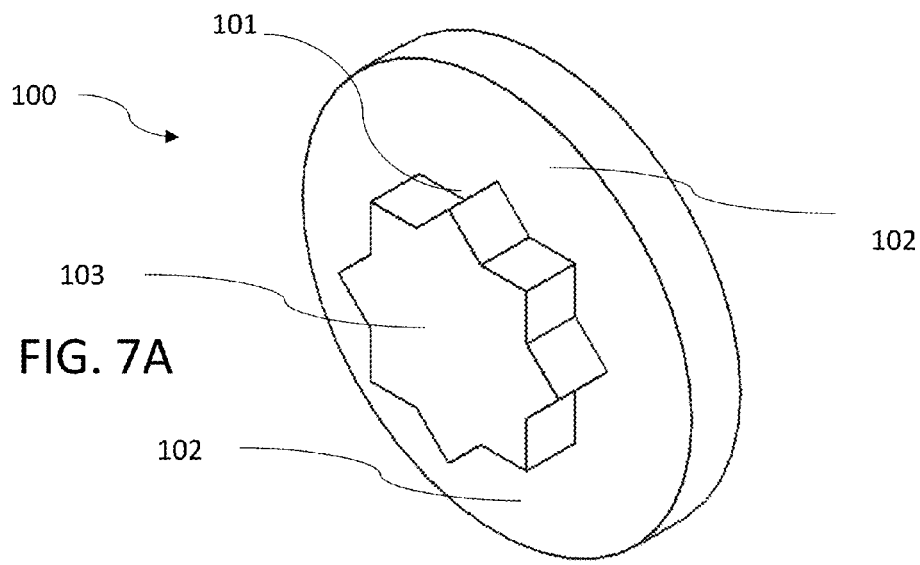
FIG. 7A illustrates a perspective view of a spacer-locator with one spacer tab and 2 double-square locator pins according to one embodiment of the present invention.

FIG. 7A is a perspective view of the spacer-locator embodiment in FIG. 3A, wherein the locator pins 103 are double-square in shape. The double-square spacer-locator provides increased resistance to rotational motions of the two substrates to which the double-square spacer-locator is bonded. The double-square also provides greater contact area between the locator pin and the substrates than an equally sized slotted spacer-locator, thereby reducing the risk of deforming the substrates and/or spacer.

Figure 7B:
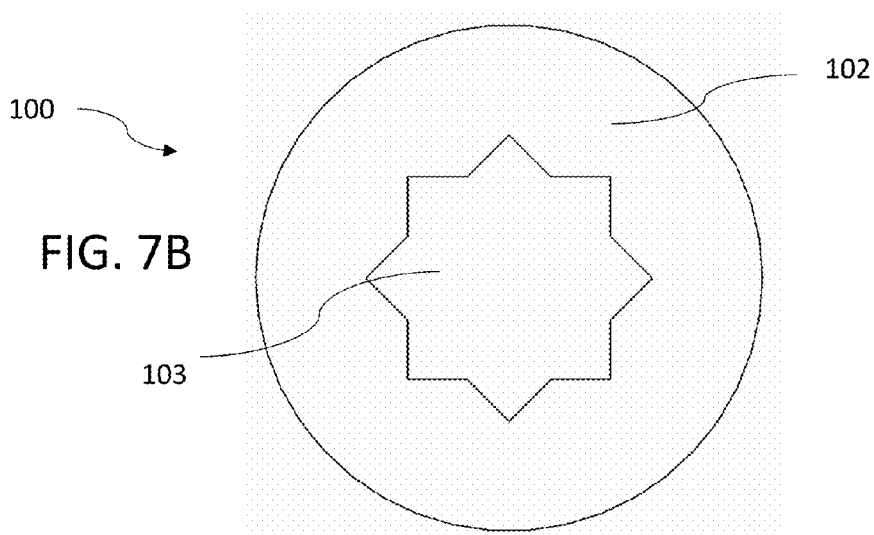
FIG. 7B illustrates a side view of the embodiment illustrated in FIG. 7A.

FIG. 7B is a top view of the spacer-locator embodiment in FIG. 7A.

Figure 7C:
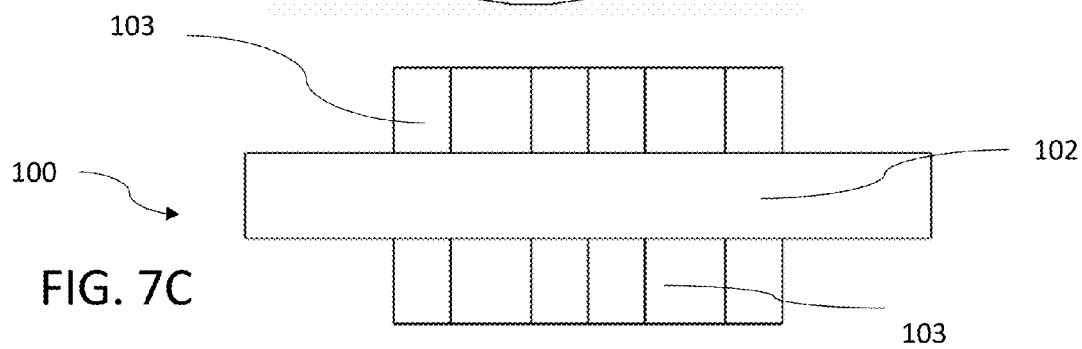
FIG. 7C illustrates a top view of the embodiment illustrated in FIGS. 7A and B.

FIG. 7C is a side view of the spacer-locator embodiment in FIG. 7A.

Figure 8:
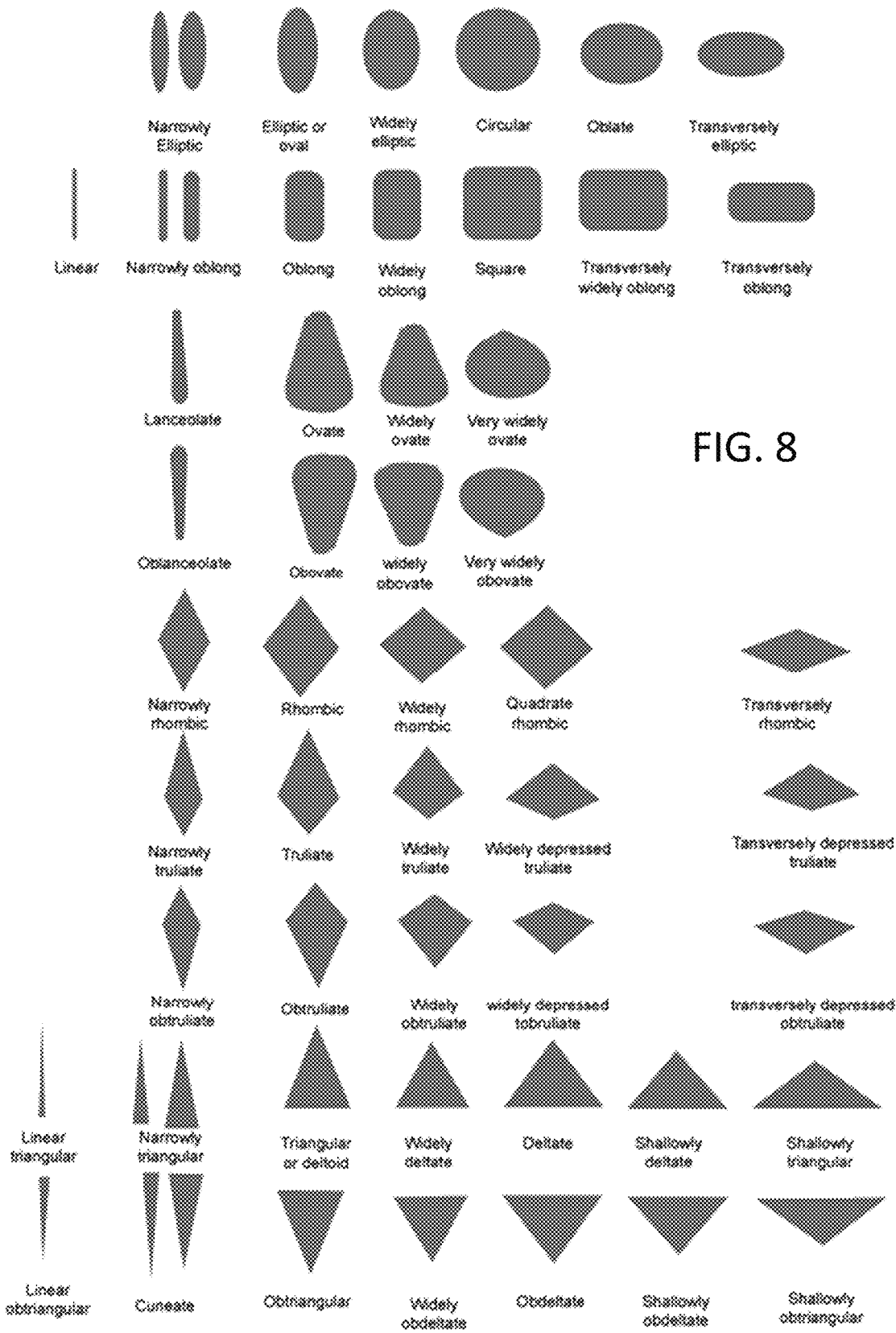
FIG. 8 illustrates some example spacer tab shapes and locator pin cross-section designs according to the present invention.

The spacer tabs are any shape that is able to maintain a specified spacing between two substrates. The tabs can be planar or non-planar. Example profile shapes for spacer tabs are shown in FIG. 8. This same figure also shows example cross-sectional shapes of the locator pins.

Figure 9A:
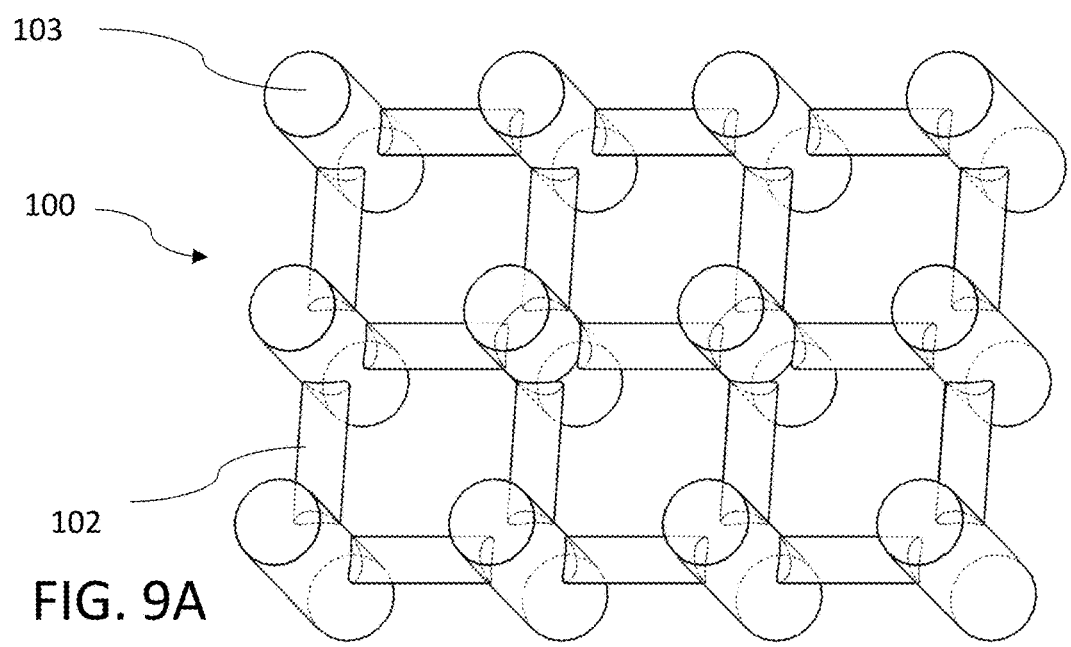
FIG. 9A illustrates a perspective view of a lattice spacer-locator designed with 12 locator pins and 17 spacer tabs according to one embodiment of the present invention.

Another embodiment of the present invention provides for a multiplicity of locator pins affixed to a multiplicity of spacer tabs. FIG. 9A is a perspective view of a lattice structure spacer-locator according to one embodiment of the present invention. The spacer-locator 100 is shaped in a lattice structure. The spacer-locator 100 includes 12 locator pins 103 and 17 spacer tabs 102. The spacer-locator 100, including the spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive. Alternatively, the locator pins 103 attach to the spacer tabs 102 with thermal bonding. The lattice design of the spacer-locator intentionally sacrifices adhesive contact area in order to maximize shear strength. To maximize shear strength, the lattice structure spacer-locator is preferably made of a material with a higher shear strength than the joining agent utilized. However, in another embodiment, the lattice structure spacer-locator is made out of a material with an approximately equivalent shear strength to the joining agent utilized.

Figure 9B:
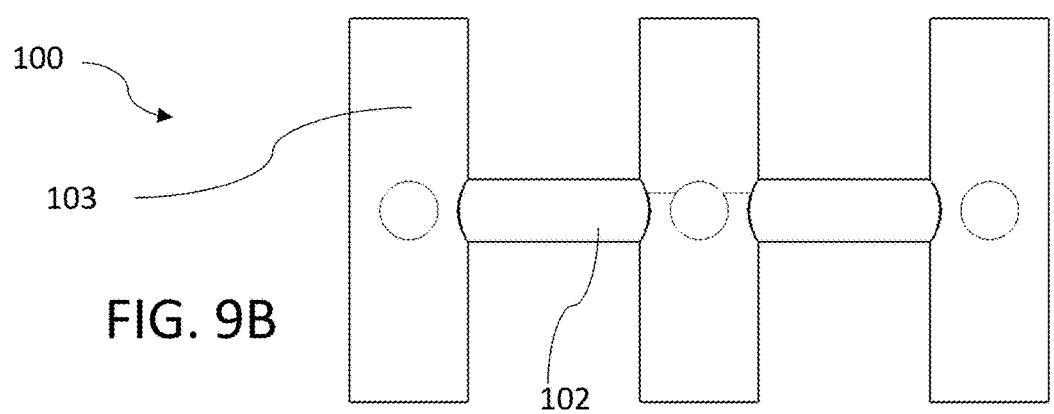
FIG. 9B illustrates a side view of the embodiment illustrated in FIG. 9A.

FIG. 9B is a side view of the spacer-locator embodiment illustrated in FIG. 9A.

Figure 9C:
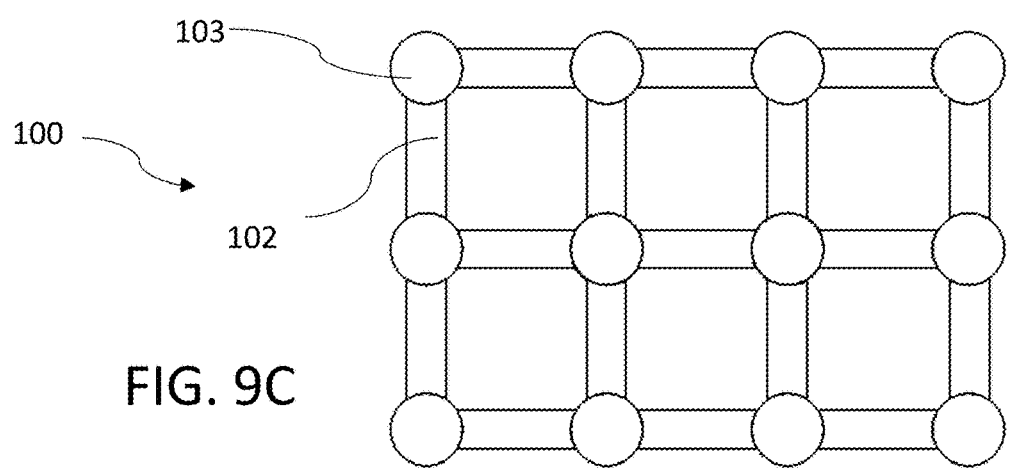
FIG. 9C illustrates a top view of the embodiment illustrated in FIGS. 9A and 9B.

FIG. 9C is a top view of the spacer-locator embodiment illustrated in FIG. 9A.

Figure 10A:
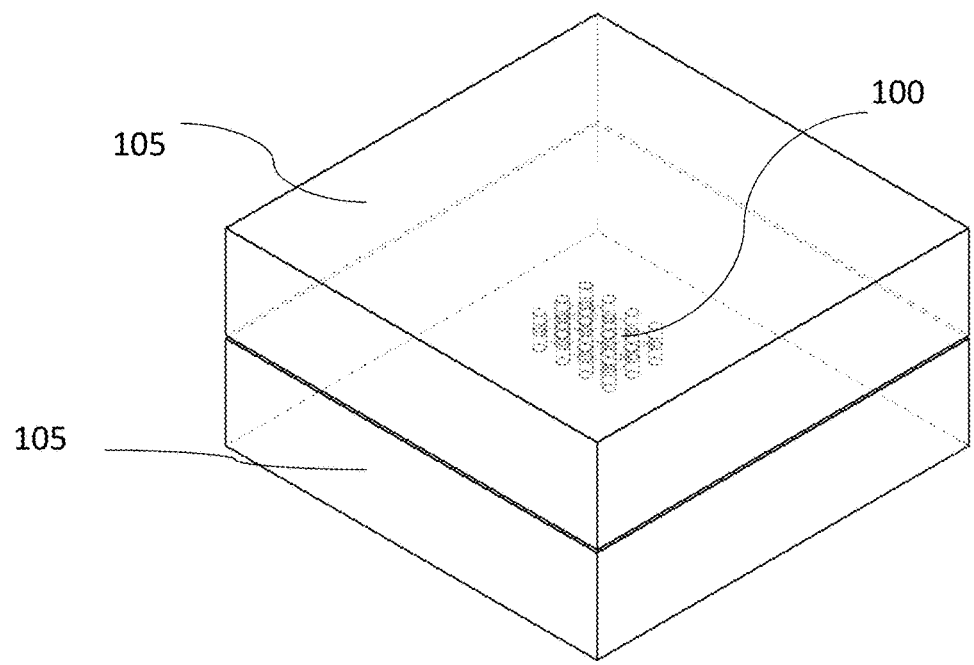
FIG. 10A illustrates a perspective view of the embodiments illustrated in FIGS. 9A, 8B, and 8C wherein the spacer-locator is included in a bonding assembly.

FIG. 10A is a perspective view of the spacer-locator embodiment illustrated in FIG. 9A, further illustrating the spacer-locator 100 in between bonded materials 105.

Figure 10B:
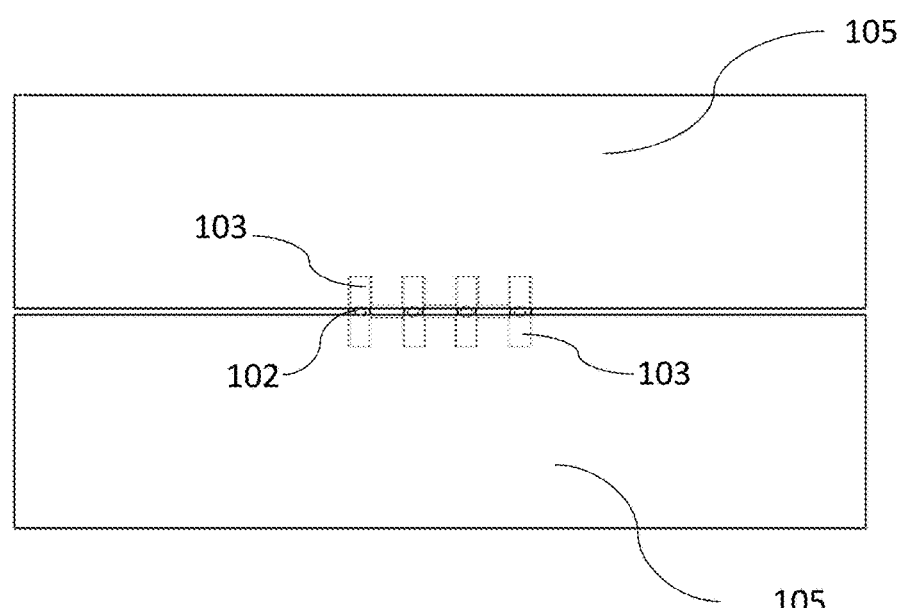
FIG. 10B illustrates a side view of the embodiments illustrated in FIGS. 9A, 8B, and 8C wherein the spacer-locator is included in a bonding assembly according to one embodiment of the present invention.

FIG. 10B is a side view of the spacer-locator embodiment illustrated in FIG. 10A, further identifying the individual locator pins 103.

Figure 11A:
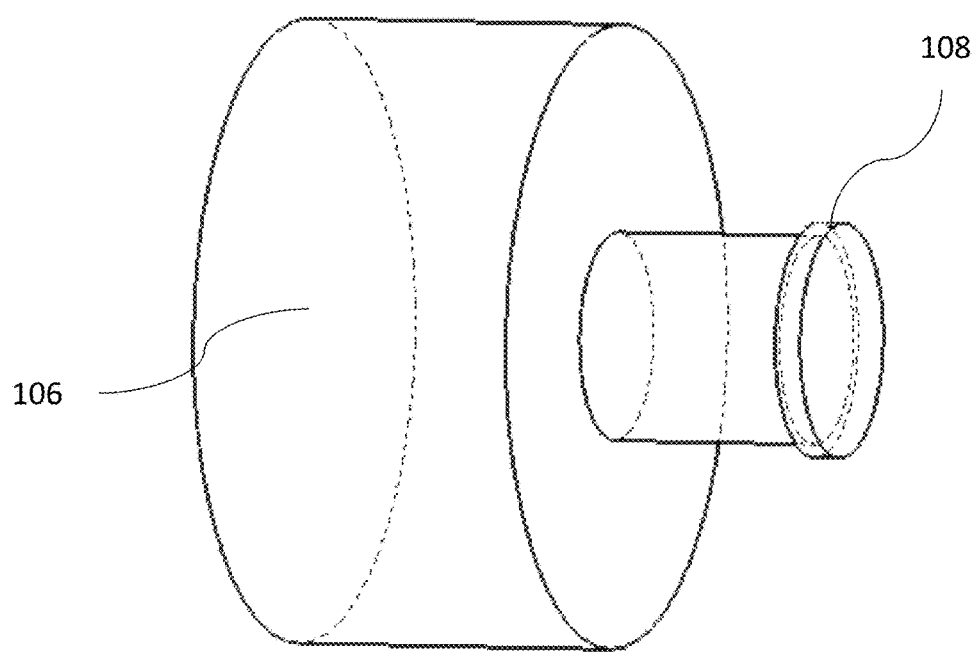
FIG. 11A illustrates a perspective view of a male locator pin according to one embodiment of the present invention.

FIG. 11A is a perspective view of a locator pin according to one embodiment of the present invention. The male locator pin 106 represents one half of the locator pin assembly, and includes threading 108 that mates with the female locator pin (illustrated as 107 in FIGS. 12A and B). Together, the male locator pin 106 and the female locator pin 107 attach to one or more spacer tabs, forming a spacer-locator.

Figure 11B:
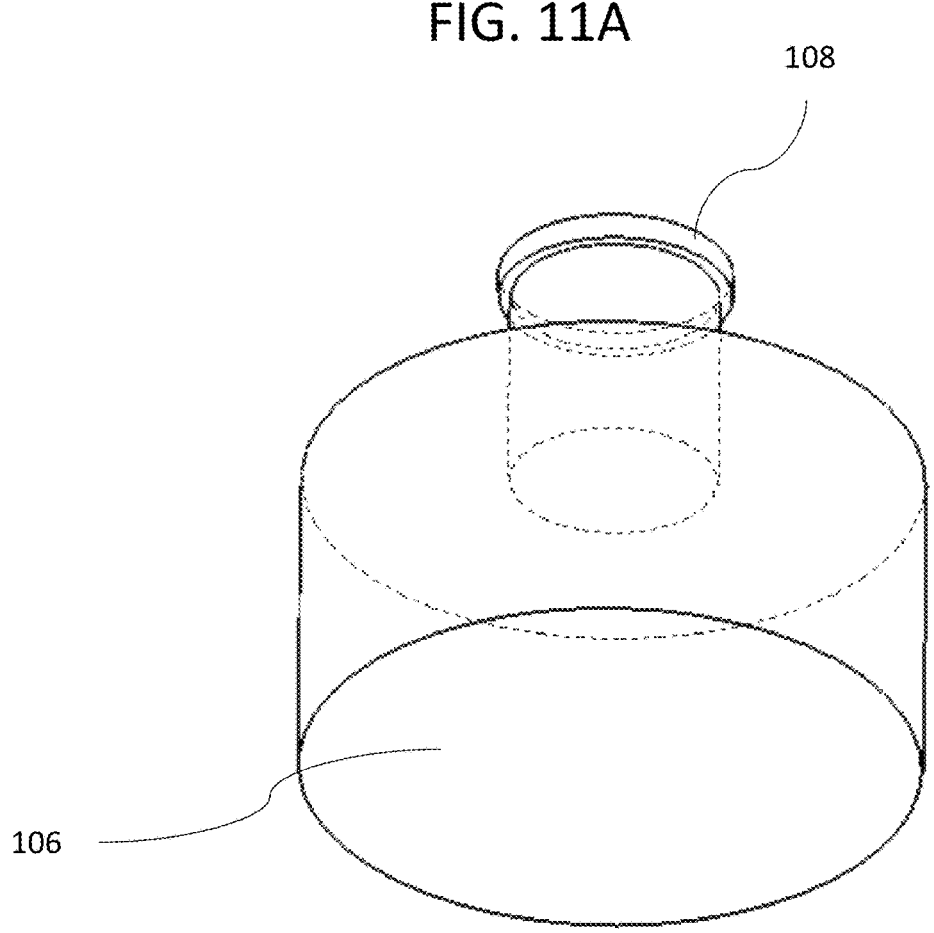
FIG. 11B illustrates another perspective view of the male locator pin illustrated in FIG. 11A.

FIG. 11B is a perspective view of the locator pin embodiment illustrated in FIG. 11A.

Figure 12A:
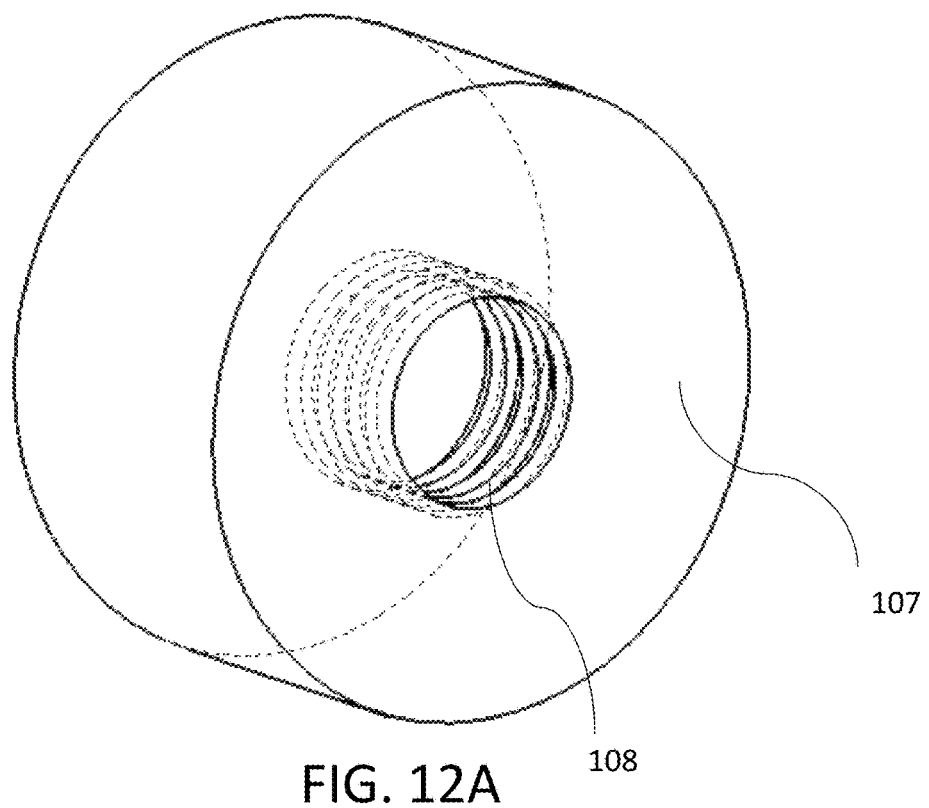
FIG. 12A illustrates a perspective view of a female locator pin according to one embodiment of the present invention.

FIG. 12A is a perspective view of a locator pin according to one embodiment of the present invention. The female locator pin 107 represents one half of the locator pin assembly, and includes threading 108 that mates with the male locator pin (illustrated in FIG. 11A and FIG. 14A).

Figure 12B:
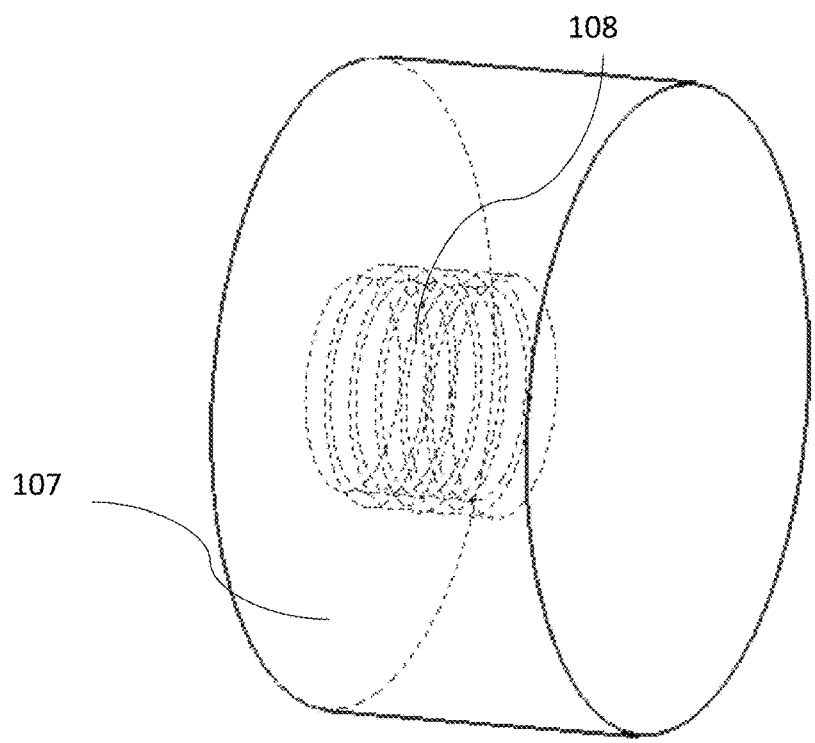
FIG. 12B illustrates another perspective view of a female locator pin illustrated in FIG. 12A.

FIG. 12B is a perspective view of the locator pin embodiment illustrated in 10A.

Figure 13A:
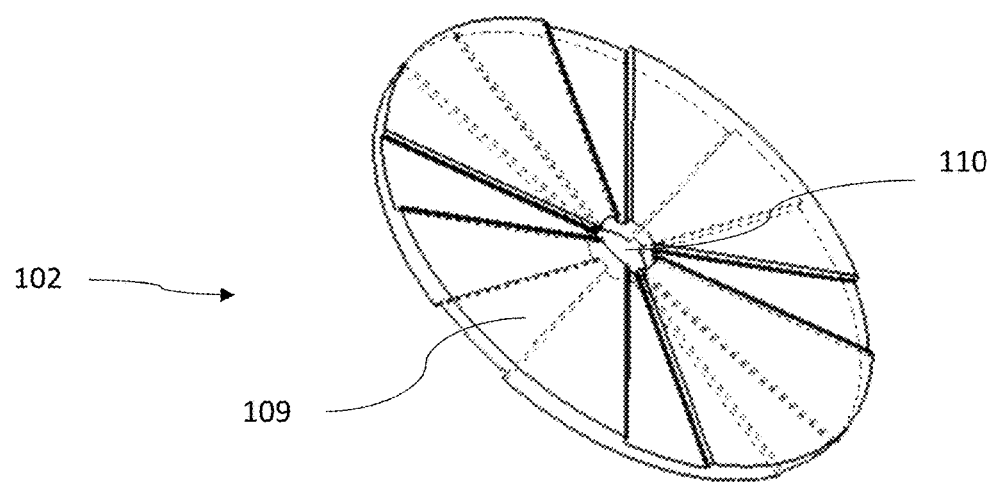
FIG. 13A illustrates a perspective view of a spacer tab with fluid channels according to one embodiment of the present invention.

FIG. 13A is a perspective view of a spacer tab according to one embodiment of the present invention. The spacer tab 102 incorporates fluid channels 109 and an opening 110 in the center of the spacer tab 102 for fitting locator pins. The spacer tab includes fluid channels in order to provide control over flow of fluids, such as adhesives, etching fluids, solvents, cleaners, primers, sealants, paints, gasses, dyes or other fluids used for the purpose of inspection, thermoset resins and/or thermoplastic resins. In circumstances where adhesive is injected, strategically positioned spacer-locators that direct fluid flow through the use of shaped spacer tabs allows a uniform and efficient adhesive application process.

Figure 13B:
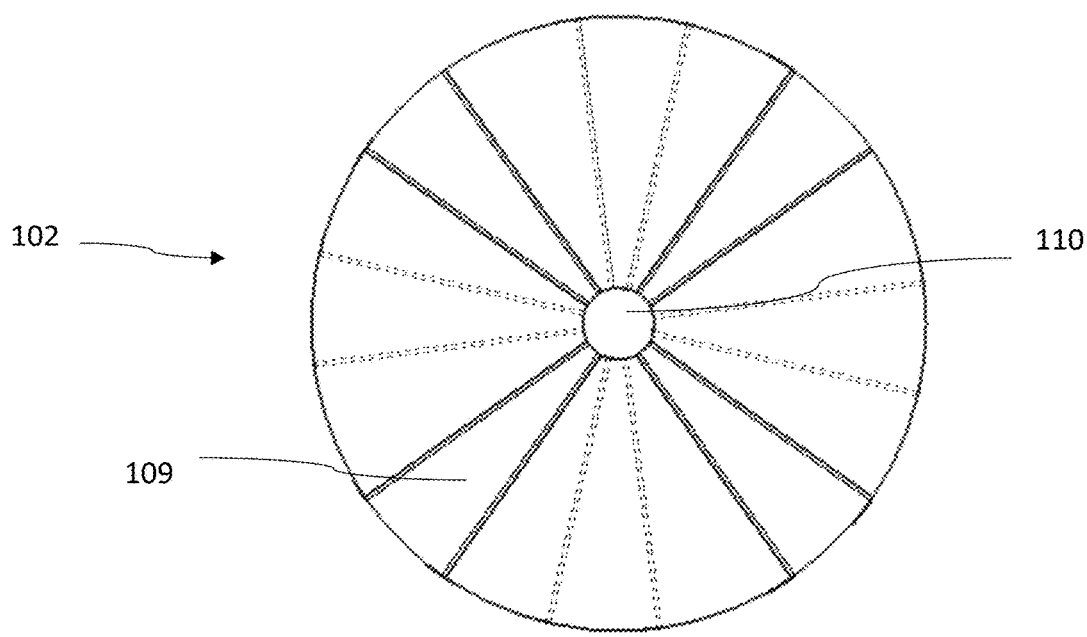
FIG. 13B illustrates a top view of the spacer tab embodiment illustrated in FIG. 13A.

FIG. 13B is a top view of the spacer tab embodiment illustrated in FIG. 13A.

Figure 13C:
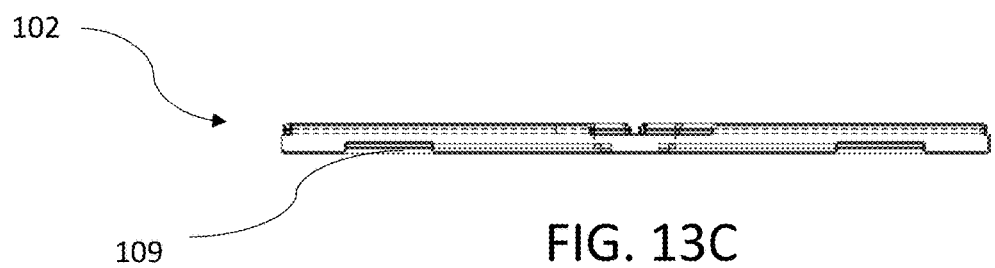
FIG. 13C illustrates a side view of the spacer tab embodiment illustrated in FIGS. 13A and B.

FIG. 13C is a side view of the spacer tab embodiment illustrated in FIG. 13A.

Figure 14A:
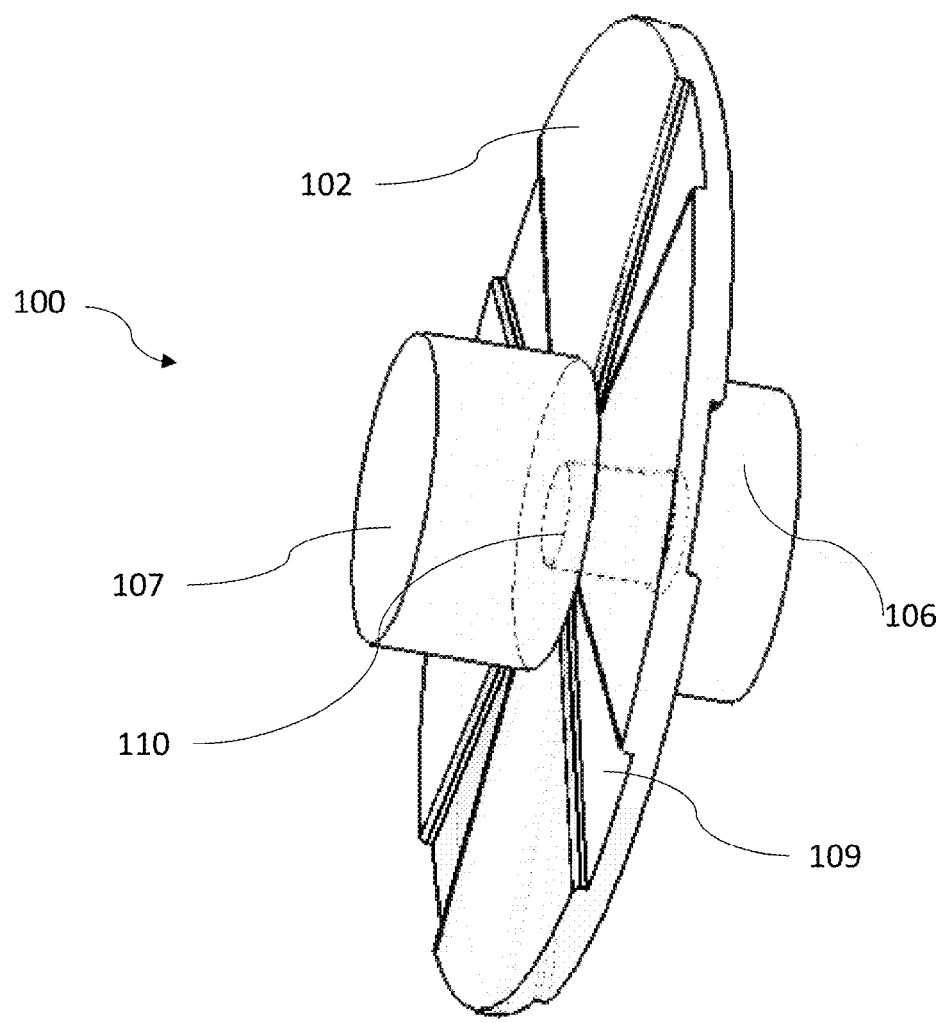
FIG. 14A illustrates a perspective view of a spacer-locator that incorporates the interchangeable locator pins illustrated in FIG. 11A, FIG. 11B, FIGS. 12A and B, and the spacer tabs illustrated in FIG. 13A-C.

FIG. 14A is a perspective view of a spacer-locator embodiment utilizing the male locator pin illustrated in FIGS. 11A and B, the female locator pin illustrated in FIGS. 11A and B, and the spacer tab illustrated in FIGS. 13A-C, according to one embodiment of the present invention. The spacer-locator 100 includes a spacer tab 102 with fluid channels 109, as well as a male locator pin 106 and a female locator pin 107. The male locator pin 106 extends through an opening 110 in the center of the spacer tab 102 and mates with the female locator pin 107. Advantageously, the male locator pin and female locator pin are operable to function with a variety of spacer tabs with different thicknesses. The fluid channels 109 of the spacer tab direct the flow of adhesive and other fluids outward from the center of the spacer tab.

Figure 14B:
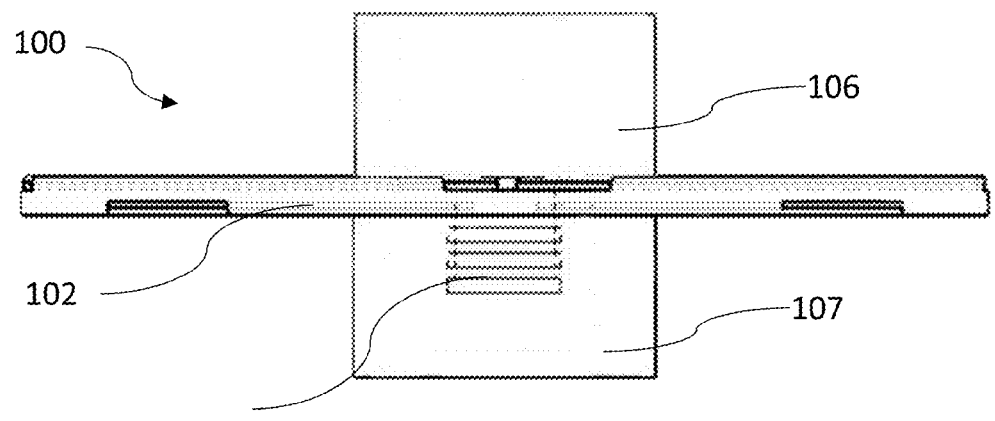
FIG. 14B illustrates a side view of the embodiment illustrated in FIG. 14A.

FIG. 14B is a side view of the spacer-locator embodiment illustrated in FIG. 14A, further illustrating the threading 108 that facilitates the mating of the male locator pin 106 and the female locator pin 107.

Figure 15A:
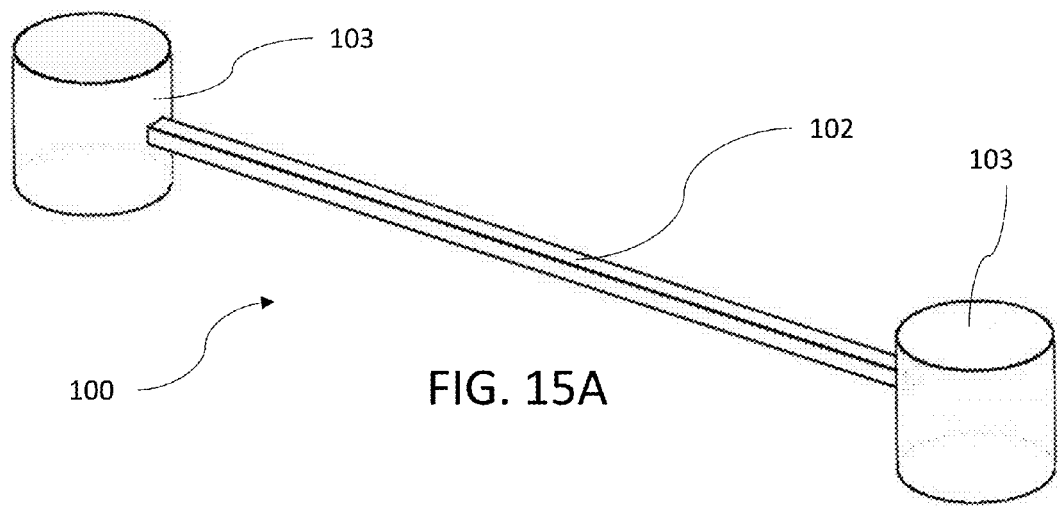
FIG. 15A illustrates a perspective view of a spacer-locator with two spacer bodies with locator pins connected by a single spacer tab according to one embodiment of the present invention.

In another embodiment of the present invention, the spacer-locator is shaped to allow the joining of more than two surfaces, wherein the multiple surfaces are all on the same bonding plane. This embodiment can bond more than two surfaces together while providing inherent anti-rotation benefits. FIG. 15A is a perspective view of a spacer-locator according to one embodiment of the present invention. The spacer-locator 100 includes 2 locator pins 103 and a spacer tab 102. The spacer tab 102, and locator pins 103 are formed from one piece of material. Alternatively, the locator pins 103 attach to the spacer tab 102 through threaded members. Alternatively, the locator pins 103 attach to the spacer tab 102 with adhesive.

Figure 15B:
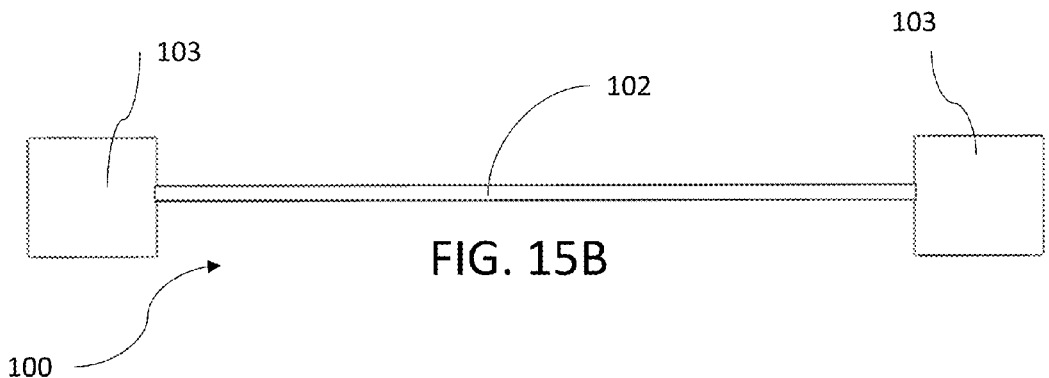
FIG. 15B illustrates a side view of the embodiment illustrated in FIG. 15A.

FIG. 15B is a side view of the spacer-locator embodiment illustrated in FIG. 15A.

Figure 15C:
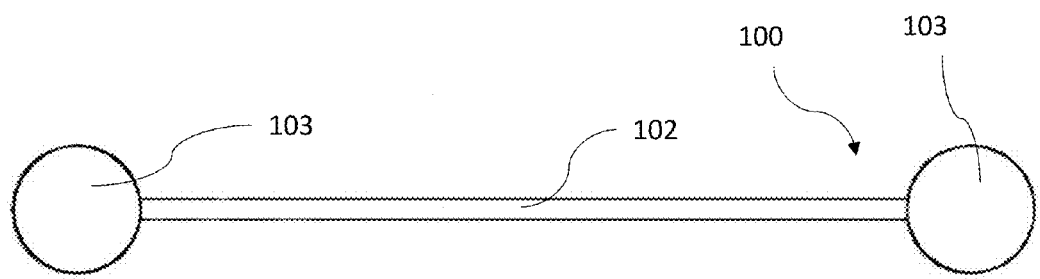
FIG. 15C illustrates a top view of the embodiment illustrated in FIGS. 15A and B.

FIG. 15C is a top view of the spacer-locator embodiment illustrated in FIG. 15A.

In another embodiment of the present invention, the spacer-locator is shaped to allow the joining of more than two surfaces, wherein the multiple surfaces are not all on the same plane.

Figure 16A:
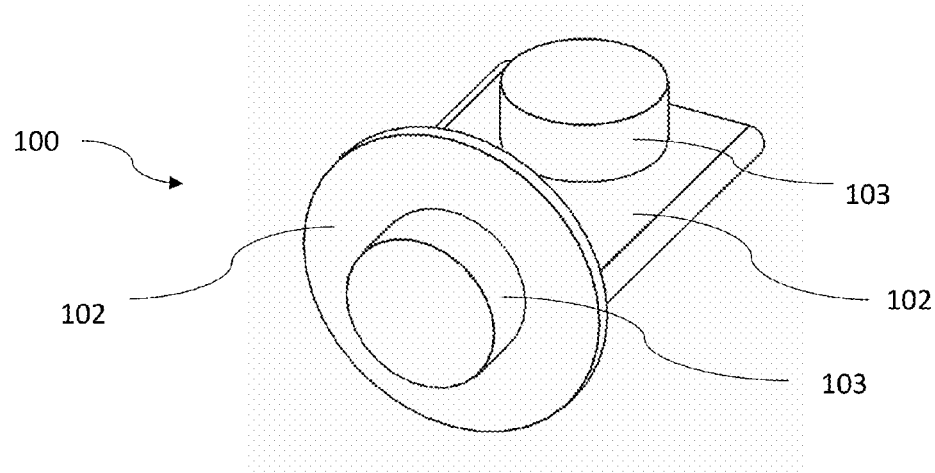
FIG. 16A illustrates a perspective view of a spacer-locator that aligns 3 surfaces according to one embodiment of the present invention.

FIG. 16A is a perspective view of another spacer-locator according to one embodiment of the present invention. The spacer-locator 100 includes spacer tabs 102 and locator pins 103. The spacer-locator 100, including the spacer tabs 102, and locator pins 103 are formed from one piece of material. Alternatively, the locator pins 103 attach to the spacer tabs 102 through threaded members. Alternatively, the locator pins 103 attach to the spacer tabs 102 with adhesive. Alternatively, the locator pins 103 attach to the spacer tabs 102 with thermal bonding. Advantageously, the spacer-locator illustrated in FIG. 16A is shaped to provide an additional spacer plane to allow the bonding of at least 3 surfaces.

Figure 16B:
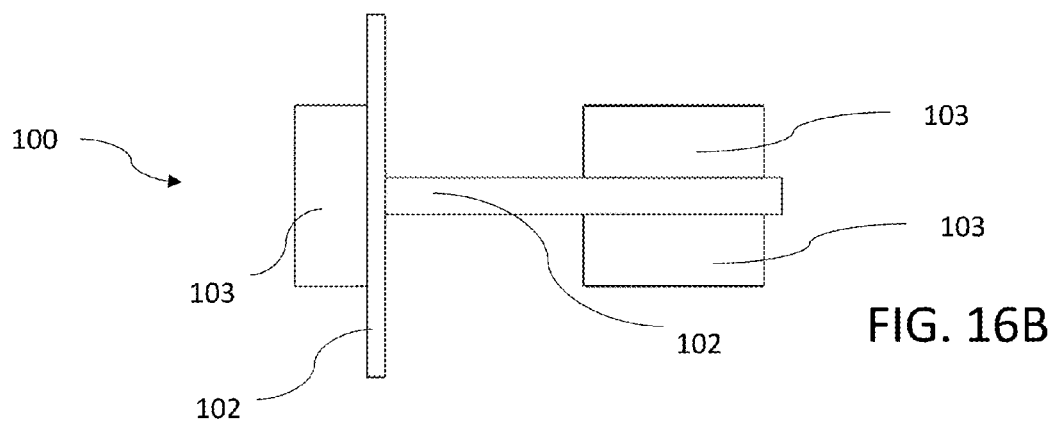
FIG. 16B illustrates a side view of the embodiment illustrated in FIG. 16A.

FIG. 16B is a side view of the spacer-locator embodiment illustrated in FIG. 16A.

Figure 16C:
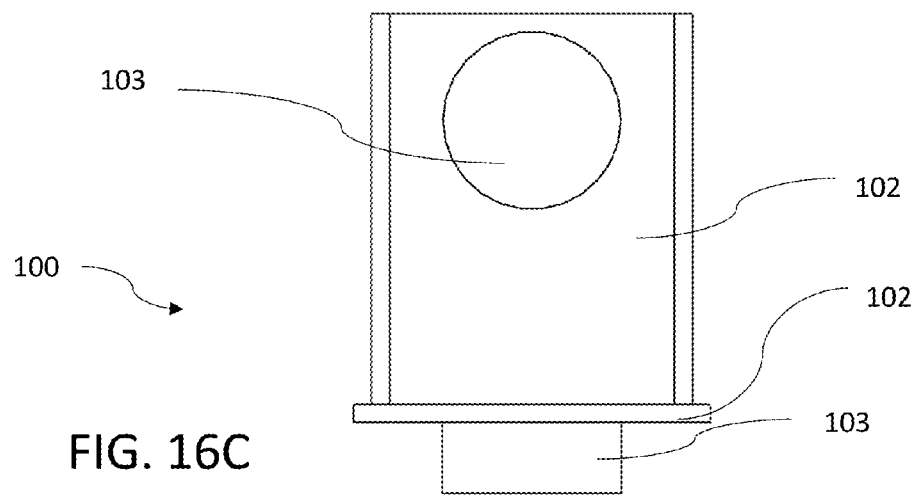
FIG. 16C illustrates a top view of the embodiment illustrated in FIGS. 16A and B.

FIG. 16C is a top view of the spacer-locator embodiment illustrated in FIG. 16A.

Figure 18A:
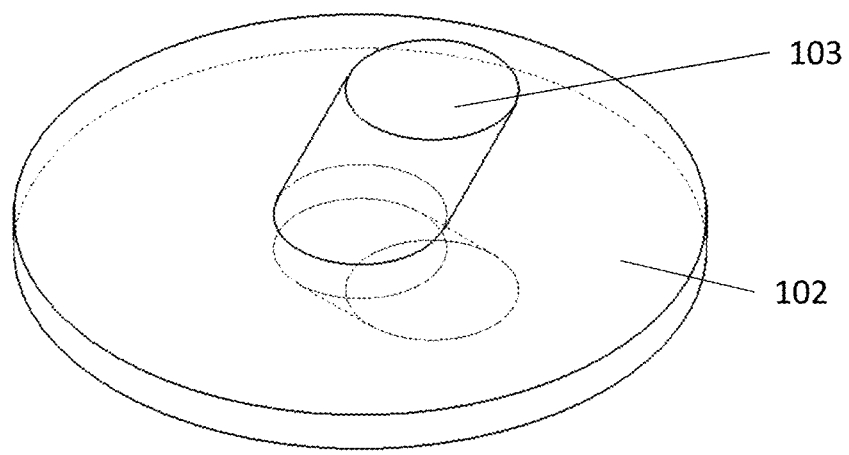
FIG. 18A illustrates a perspective view of a spacer-locator that has locator pins that are not perpendicular to the mating surfaces.
Figure 18B:
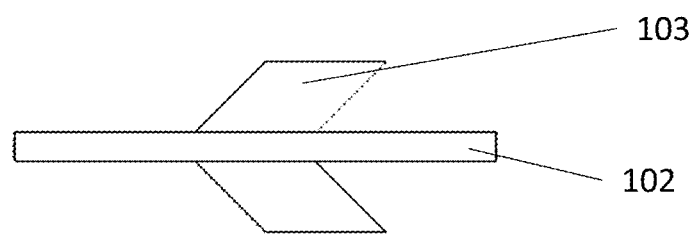
FIG. 18B illustrates a side view of the embodiment illustrated in FIG. 18A.

In an alternative embodiment, the spacer-locator allows the joining of at least 4 surfaces (FIGS. 17A-C). In another alternative embodiment, the locator pins are not perpendicular to the mating surface (FIGS. 18A-B). This allows for joining objects that cannot be inserted into the space orthogonally to the mating surfaces, or are angled with respect to the mating surfaces and not of sufficient size to accommodate a perpendicular locator pin. These embodiments provide additional functionality in ensuring substantially uniform adhesive thickness between numerous components that are joined together simultaneously.

In an alternative embodiment of the present invention, rotation is prevented between mating surfaces by incorporating an anti-rotation feature into the spacer tabs. FIGS. 19A-C illustrates a spacer-locator for joining 8 surfaces wherein the anti-rotation feature is provided by the spacer tabs. The vertical tabs 111, in addition to maintaining the space between the surfaces, also prevent rotation of the surfaces because the orthogonal shape formed by two adjacent spacer-tabs prevents the rotation of the orthogonal objects being bonded.

Figure 20A:
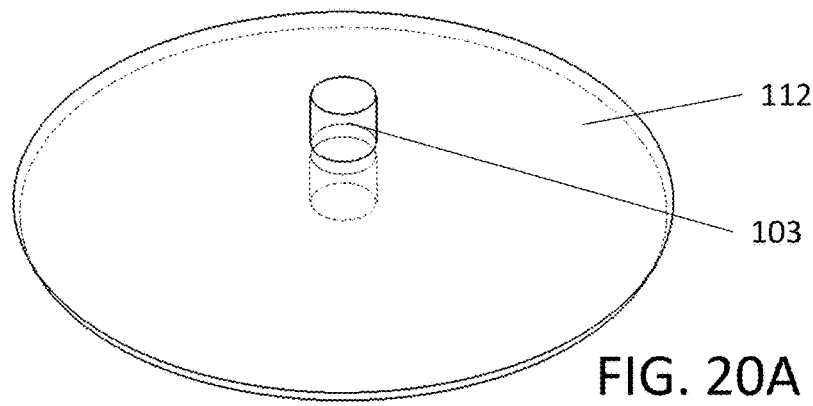
FIG. 20A illustrates a perspective view of a spacer-locator that aligns a concave and a convex surface according to one embodiment of the present invention.
Figure 20B:
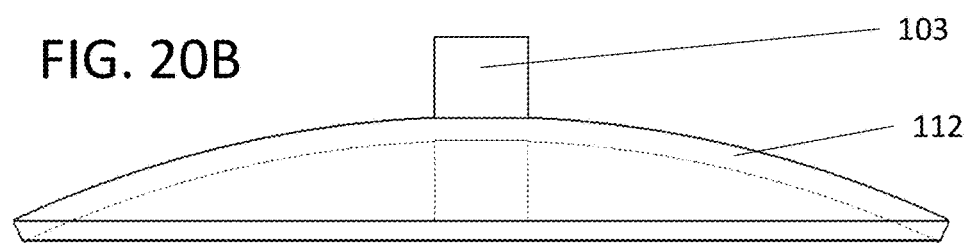
FIG. 20B illustrates a side view of the embodiment illustrated in FIG. 20A.
Figure 20C:
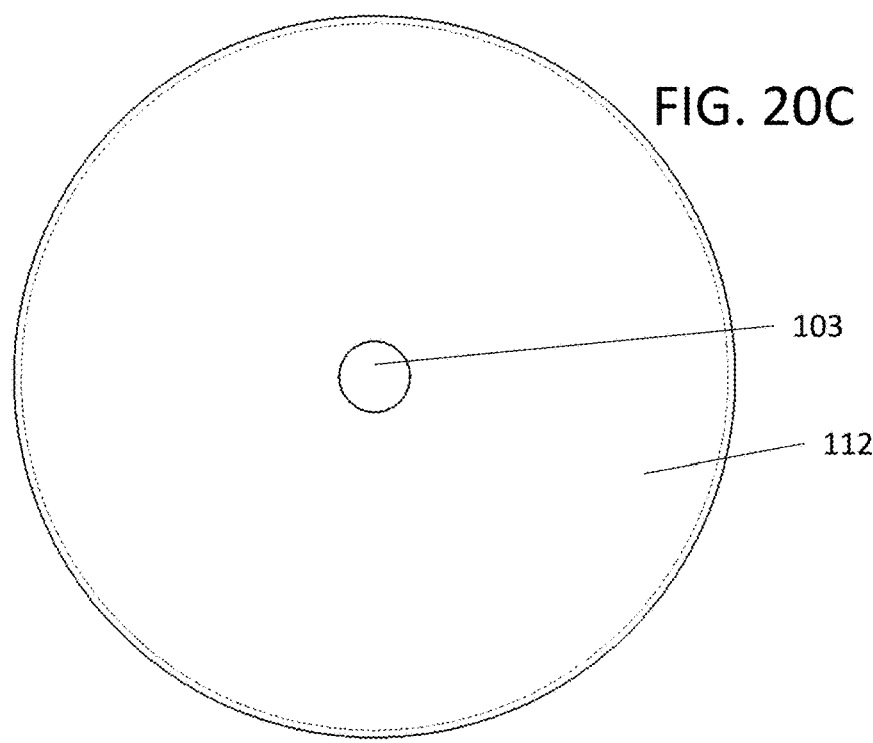
FIG. 20C illustrates a top view of the embodiment illustrated in FIGS. 20A and B.

The present invention also provides for spacer-locators designed and configured to join non-planar surfaces together. An example spacer-locator with non-planar spacer tab 112 is shown in FIGS. 20A-C. Here, a partial-sphere surface spacer-locator is illustrated which is used to join together a concave and a convex surface. Another example includes a partial-cylinder surface spacer-locator (not shown).

Figure 22A:
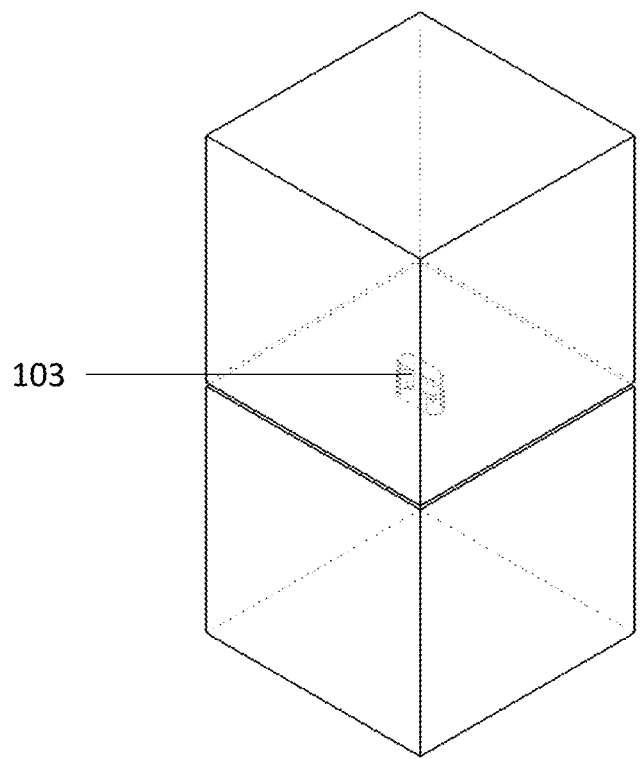
FIG. 22A illustrates a transparent perspective view of two objects held in position by a spacer-locator with a slot locator and no spacer tabs according to the present invention.
Figure 22B:
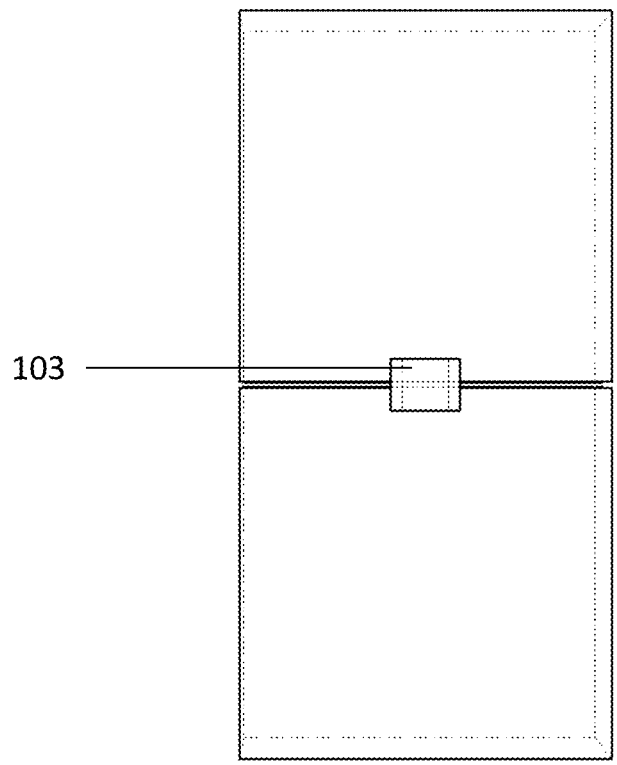
FIG. 22B illustrates a transparent side view of the embodiment illustrated in FIG. 22A.

In another embodiment, the spacer-locator contains no spacer tabs. The desired separation is maintained by using at least one spacer locator pin with a length that is greater than the combined depth of the positioning holes. The spacer locator pin is thus sized to provide the desired separation between the mating surfaces and the desired mechanical strength against shear stress. In some examples of this embodiment, the spacer locator pin is shaped as a prolate spheroid, cylinder (FIGS. 21A&B) or slot (FIGS. 22A&B) The slot shape has a cross-section that is an elongated rectangular with rounded corners; this cross-section shape is also called stadium, discorectangle, or obround.

Another embodiment provides for a spacer-locator integrated into one of the objects to be joined (FIGS. 23A-C). FIG. 23A illustrates a perspective view of two spacer-locators integrated into an object. FIGS. 23B and C are a side view and a top view of the embodiment, respectively. The mating object contains the corresponding locator hole(s). Thus, the present invention provides a system for joining two objects together, wherein the spacer-locator is integral with one of the objects and the other object contains a corresponding locator hole.

Figure 24A:
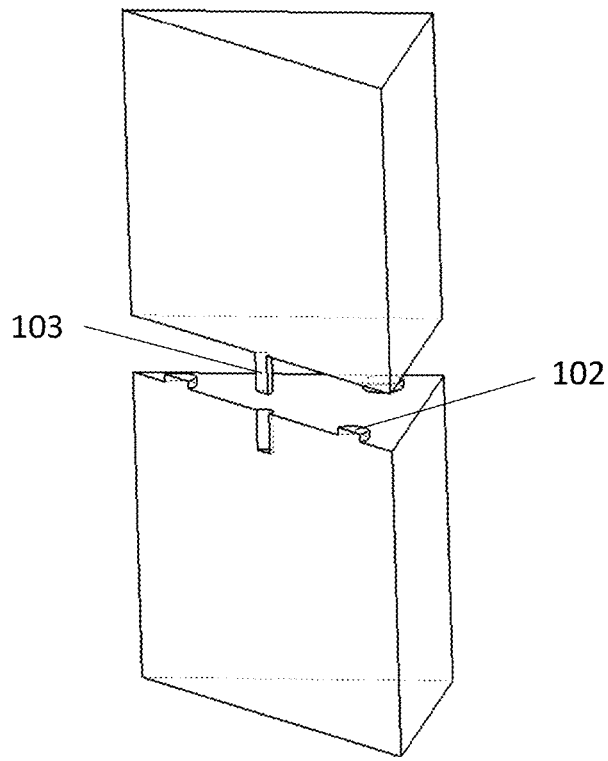
FIG. 24A illustrates a cross-sectional, transparent, exploded perspective view of two objects held in position with a locator pin on one object and spacer tabs on the opposing object.
Figure 24B:
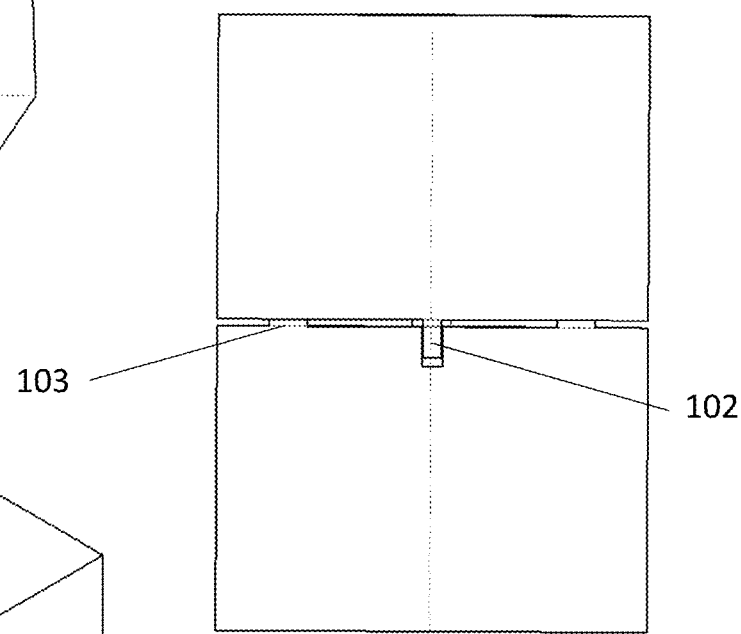
FIG. 24B illustrates a cross-sectional side view of the embodiment illustrated in FIG. 24A.
Figure 24C:
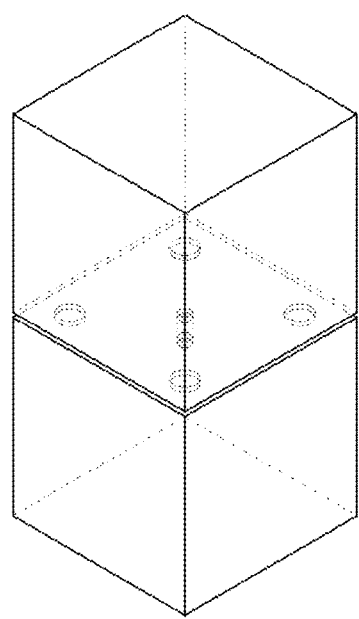
FIG. 24C illustrates a transparent perspective view of the embodiment illustrated in FIGS. 24A and B.

As shown in FIGS. 23A-C, the spacer tab and the locator pin are located on the same object. Alternatively, they are located on opposing objects, as shown in FIGS. 24A-C.

The spacer-locator and/or locator pin are preferably manufactured with a material that has the same or similar intrinsic material properties as the mating surfaces. For example, the spacer-locator material has the same or similar electrical conductivity, thermal expansion, corrosion resistance, and/or aesthetic qualities as the mating surfaces.

The various components of the spacer-locator are attached to one another using any acceptable means or combinations of means. For example, the components are attached to one another by mechanical fastening, by way of example and not limitation, through the utilization of threaded members. In another example, the components are attached using adhesives, that include, but are not limited to, laminates, hot adhesives, reactive adhesives, polyester—polyurethane resin, polyols-polyurethane resin, acrylic polymers—polyurethane resin, epoxy, methacrylate, and/or cyanoacrylate. In yet another example, the components are attached by thermal bonding, including but not limited to, plastic welding, electric welding, tungsten arc welding and/or soldering. In another example, the components are attached through the use of magnets within the locator pins and the spacer body.

The above-mentioned examples are provided to serve the purpose of clarifying the aspects of the invention, and it will be apparent to one skilled in the art that they do not serve to limit the scope of the invention. By way of example, the spacer-locator may be different shapes. Also by way of example, the locator pins may be different shapes and sizes to provide required strength characteristics or accommodate manufacturing processes. By its nature, this invention is highly adjustable, customizable and adaptable. The above-mention examples are just some of the many configurations that the mentioned components can take on. All modifications and improvements have been deleted herein for the sake of conciseness and readability but are properly within the scope of the present invention.

The invention claimed is:

1. A spacer-locator for spacing and locating at least two objects along mating surfaces, the position of the at least two objects described with an x-axis and a y-axis along the mating surfaces, a z-axis perpendicular to the mating surfaces, a psi angle around the z-axis, a phi angle around the x-axis, and a theta angle around the y-axis; the spacer-locator comprising:
   at least one spacer tab;
   the at least one spacer tab constructed with a predetermined thickness;
   the at least one spacer tab operable for separating the at least two objects a predetermined distance along the z-axis; and
   at least two locator pins connected by the at least one spacer tab, wherein at least one of the at least two locator pins is operable for constraining movement of the at least two objects along the x-axis and y-axis and the phi angle and theta angle;
   wherein the spacer-locator provides a controlled alignment of the at least two objects at the mating surfaces.

2. The spacer-locator of claim 1, wherein the mating surfaces are planar or non-planar.

3. The spacer-locator of claim 1, wherein the at least one spacer tab includes at least one fluid channel.

4. The spacer-locator of claim 1, wherein the spacer-locator is manufactured with the same material as the at least two objects.

5. The spacer-locator of claim 1, wherein the spacer-locator is integral with one of the mating surfaces.

6. The spacer-locator of claim 1, wherein each of the at least two locator pins comprise two mating components reversibly or permanently attachable to form the spacer-locator.

7. The spacer-locator of claim 1, wherein the at least two locator pins enhance the strength of bonding.

8. The spacer-locator of claim 1, wherein the spacer-locator has similar intrinsic material properties as the mating surfaces.

9. The spacer-locator of claim 8, wherein the intrinsic material properties include electrical conductivity, thermal expansion, corrosion resistance, and/or aesthetic qualities.

10. A spacer-locator for spacing and locating at least two objects along mating surfaces, the position of the at least two objects described with an x-axis and a y-axis along the mating surfaces, a z-axis perpendicular to the mating surfaces, a psi angle around the z-axis, a phi angle around the x-axis, and a theta angle around the y-axis; the spacer-locator comprising:
   at least one spacer tab;
   the at least one spacer tab constructed with a predetermined thickness;
   the at least one spacer tab operable for separating the at least two objects a predetermined distance along the z-axis; and at least one locator pin operable for constraining movement of the at least two objects along the x-axis and y-axis and the phi angle and theta angle, wherein the at least one locator pin is non-perpendicular to the mating surfaces;

wherein the spacer-locator provides a controlled alignment of the at least two objects at the mating surfaces.

11. A spacer-locator for spacing and locating at least two objects along mating surfaces, the position of the at least two objects described with an x-axis and a y-axis along the mating surfaces, a z-axis perpendicular to the mating surfaces, a psi angle around the z-axis, a phi angle around the x-axis, and a theta angle around the y-axis; the spacer-locator comprising:

at least one spacer tab;

the at least one spacer tab constructed with a predetermined thickness;

the at least one spacer tab operable for separating the at least two objects a predetermined distance along the z-axis; and at least one locator pin operable for constraining movement of the at least two objects along the x-axis and y-axis and the phi angle and theta angle, wherein the at least one locator pin is operable to prevent rotation of the objects around the psi angle, and wherein the at least one locator pin has a non-circular cross-section to prevent rotation;

wherein the spacer-locator provides a controlled alignment of the at least two objects at the mating surfaces.

12. The spacer-locator of claim 11, wherein the at least one locator pin is integral with one of the mating surfaces.

13. The spacer-locator of claim 11, wherein the at least one spacer tab is integral with one of the mating surfaces.

14. A spacer-locator for spacing and locating at least two objects along mating surfaces, the position of the at least two objects described with an x-axis and a y-axis along the mating surfaces, a z-axis perpendicular to the mating surfaces, a psi angle around the z-axis, a phi angle around the x-axis, and a theta angle around the y-axis; the spacer-locator comprising:

at least one spacer tab;

the at least one spacer tab constructed with a predetermined thickness;

the at least one spacer tab operable for separating the at least two objects a predetermined distance along the z-axis;

at least one locator pin operable for constraining movement of the at least two objects along the x-axis and y-axis and the phi angle and theta angle;

at least one additional locator pin and at least one additional spacer tab; and the at least one additional locator pin and the at least one additional spacer tab operable for bonding at least one additional object along additional mating surfaces;

wherein the spacer-locator provides a controlled alignment of the at least two objects at the mating surfaces.

15. The spacer-locator of claim 14, wherein the at least one locator pin is integral with one of the mating surfaces.

16. The spacer-locator of claim 14, wherein the at least one spacer tab is integral with one of the mating surfaces.

17. A spacer-locator for spacing and locating at least two objects along mating surfaces, the position of the at least two objects described with an x-axis and a y-axis along the mating surfaces, a z-axis perpendicular to the mating surfaces, a psi angle around the z-axis, a phi angle around the x-axis, and a theta angle around the y-axis; the spacer-locator comprising:

at least one spacer tab;

the at least one spacer tab constructed with a predetermined thickness;

the at least one spacer tab operable for separating the at least two objects a predetermined distance along the z-axis;

at least one locator pin operable for constraining movement of the at least two objects along the x-axis and y-axis and the phi angle and theta angle; and at least one additional spacer tab along an additional mating surface that prevents rotation of at least one of the at least two objects around the psi angle;

wherein the spacer-locator provides a controlled alignment of the at least two objects at the mating surfaces.

18. The spacer-locator of claim 17, wherein the at least one locator pin is integral with one of the mating surfaces.

19. The spacer-locator of claim 17, wherein the at least one spacer tab is integral with one of the mating surfaces.

20. The spacer-locator of claim 10, wherein the at least one locator pin is integral with one of the mating surfaces.

21. The spacer-locator of claim 10, wherein the at least one spacer tab is integral with one of the mating surfaces.

22. The spacer-locator of claim 11, wherein the non-circular cross-section is selected from the group consisting of regular polygon and irregular polygon.

23. The spacer-locator of claim 13, wherein the at least one spacer tab and the at least one additional spacer tab are perpendicular to one another.

* * * * *